United States Patent [19]

Pivar

[11] 4,313,517
[45] Feb. 2, 1982

[54] LIGHTWEIGHT ELECTRICALLY DRIVEN THREE-WHEELED VEHICLE WITH LOW CENTER OF GRAVITY AND LIGHTWEIGHT SUPERSTRUCTURE INCLUDING IMPROVED BRAKING SYSTEM

[75] Inventor: Stuart Pivar, New York, N.Y.

[73] Assignee: American Microcar, Inc., Farmingdale, N.Y.

[21] Appl. No.: 111,199

[22] Filed: Jan. 11, 1980

Related U.S. Application Data

[63] Continuation-in-part of Ser. No. 963,282, Nov. 24, 1978, Pat. No. 4,237,995.

[51] Int. Cl.³ .................. B60L 7/24; B62D 61/06; B62J 17/00; B62M 7/04
[52] U.S. Cl. .................. 180/216; 180/65 A; 180/205; 180/210; 180/217; 280/289 S; 296/78.1
[58] Field of Search ............... 180/205, 207, 210, 215, 180/216, 217, 65 R, 65 A; 280/282, 289 S, 274; 296/78.1

[56] References Cited

U.S. PATENT DOCUMENTS

2,670,965  3/1954  Ritzel .................. 280/274
3,117,648  1/1964  Landreth .................. 180/210
4,020,914  5/1977  Trautwein .................. 180/210
4,183,418  1/1980  Dudas .................. 280/282

*Primary Examiner*—Joseph F. Peters, Jr.
*Assistant Examiner*—Donn McGiehan
*Attorney, Agent, or Firm*—Posnack, Roberts, Cohen & Spiecens

[57] ABSTRACT

A three-wheeled vehicle is provided to operate from a source of power constituted by two batteries which constitute approximately one-third of the weight of the unloaded vehicle. The batteries are so positioned as to locate the center of gravity of the vehicle relatively low. The vehicle is provided with a superstructure which is relatively light so that the center of the gravity is not greatly affected thereby. The superstructure provides protection for the passenger or passengers who are sheltered thereby. The passengers are seated at a relatively high position relative to the ground traversed so that they obtain a feeling of security and confidence and can readily see because their relatively high position with respect to other vehicles or obstacles in the vicinity. The additional weight of the batteries is accommodated by the provision of a compound braking system consisting of mechanical and electro-magnetic braking elements.

31 Claims, 25 Drawing Figures

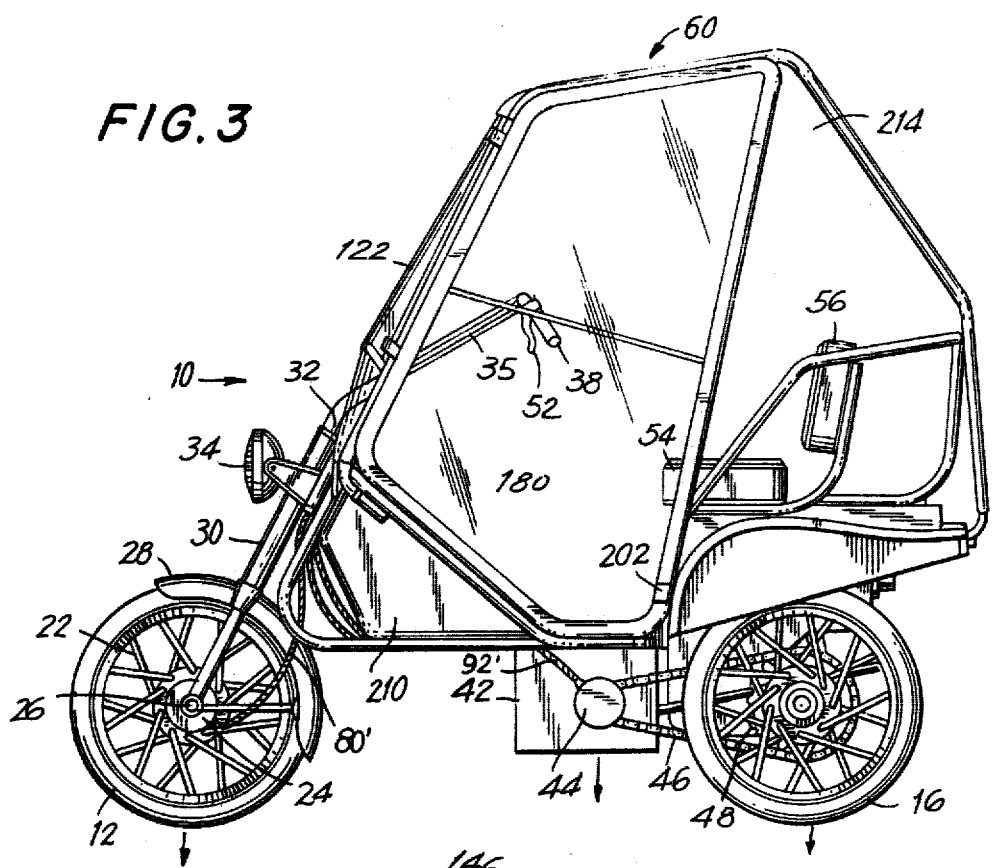
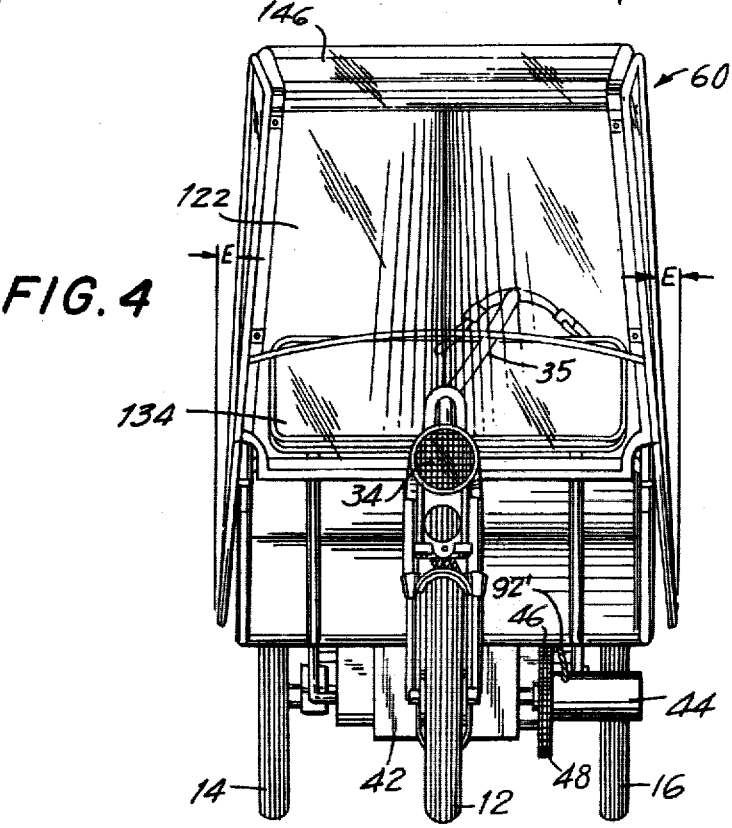

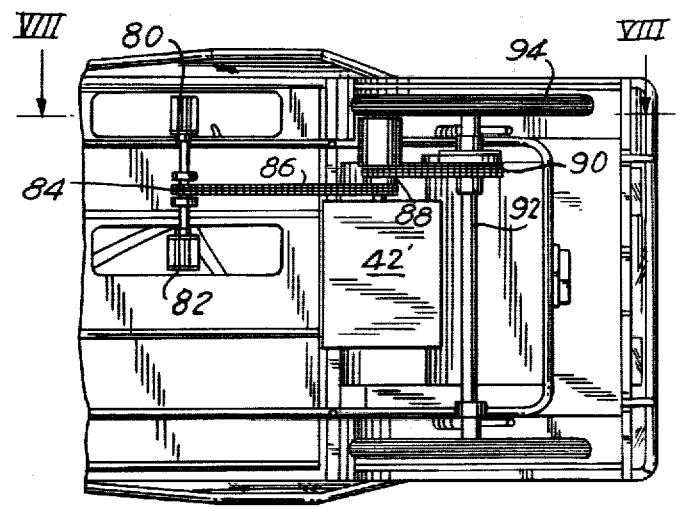
FIG. 7
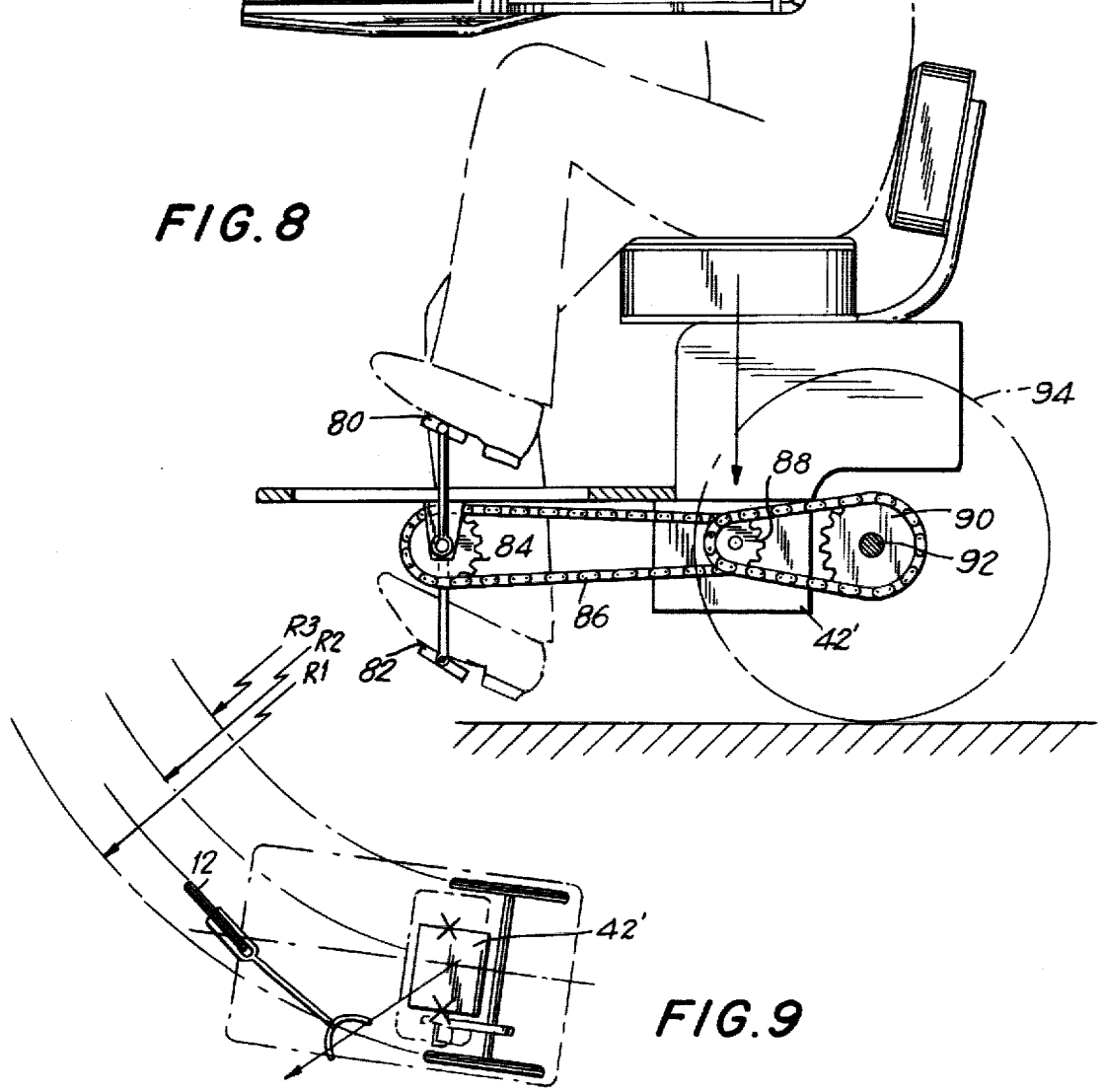
FIG. 8
FIG. 9

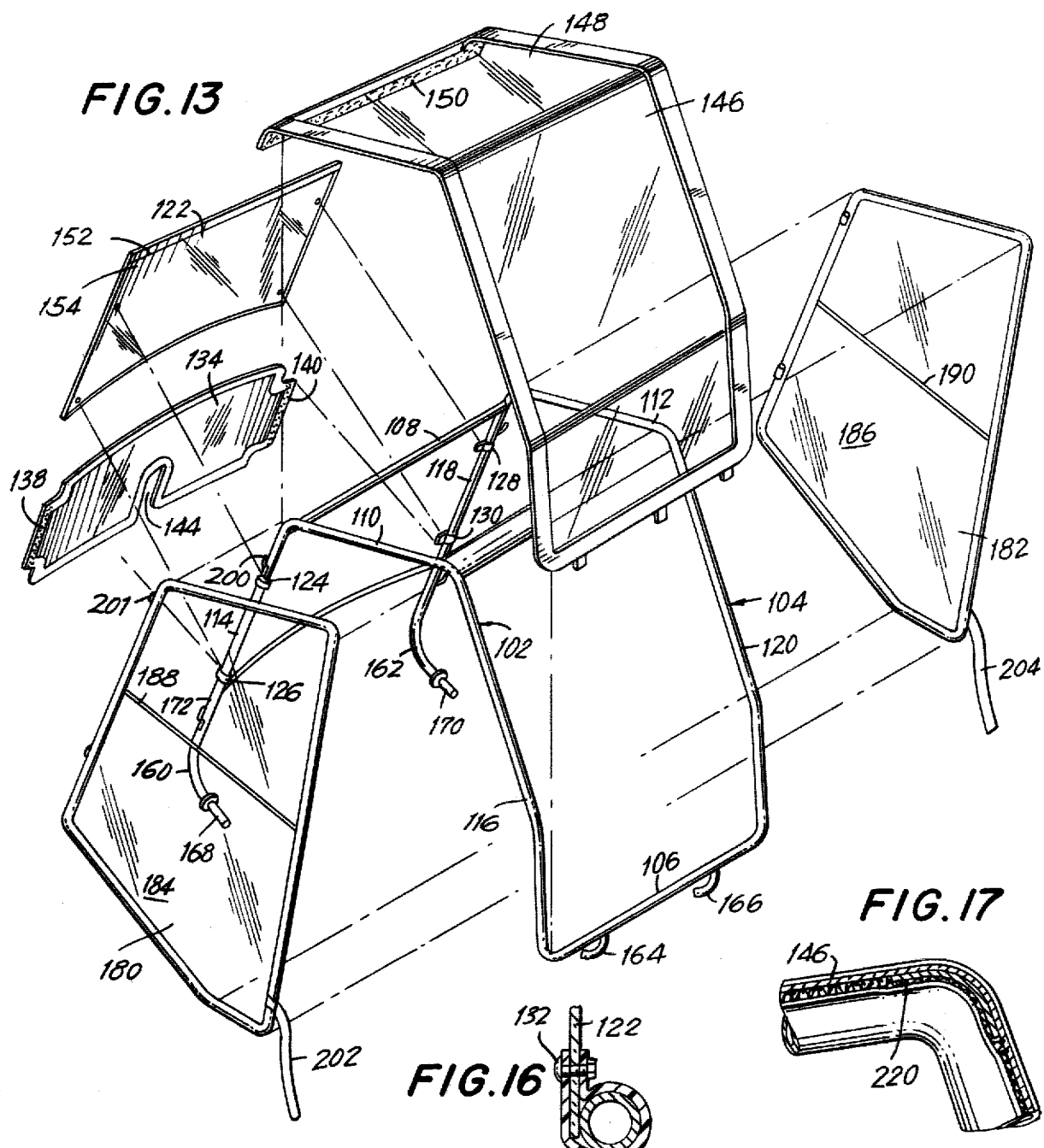

LIGHTWEIGHT ELECTRICALLY DRIVEN THREE-WHEELED VEHICLE WITH LOW CENTER OF GRAVITY AND LIGHTWEIGHT SUPERSTRUCTURE INCLUDING IMPROVED BRAKING SYSTEM

OTHER APPLICATIONS

This application is a continuation-in-part application of application Ser. No. 963,282, filed Nov. 24, 1978, now U.S. Pat. No. 4,237,995.

FIELD OF INVENTION

This invention relates to three-wheeled vehicles and more particularly to three-wheeled vehicles preferably driven by storage batteries and provided with a low center of gravity so as to facilitate appropriate positioning of the driver and passengers and particularly to vehicles having lightweight superstructures which provide shelter without materially affecting the center of gravity.

BACKGROUND

Three-wheeled vehicle have long been used for automotive transportation. Their use has been limited because of the problem of instability, for which reason four-wheeled vehicles have become prevalent.

Certain specialized three-wheeled vehicles are used today such as golf carts and delivery and other small utility vehicles, as well as three-wheeled motorcycles used as sport vehicles. To increase stability, these vehicles are generally built with a low center of gravity. This is accomplished by the use of small wheels and the placement of passenger seating in a relatively low position.

In the United States, Federal and local laws place minimums on the diameter of wheels and on the distance of the seat from the ground. This limits the degree of stability possible in the design of three-wheeled vehicles. As a result, many commercially made three-wheeled automobile vehicles manufactured in this country and in others are not legally usable on roads in the U.S. Although many of these are made in and used in Europe, they are not imported into the U.S. Those made here are relegated to "off road" use, or use by governmental agencies such as police, which are permitted to use vehicles which do not conform to these regulations. Three-wheeled motorcycles are generally used by experienced sport motorcycle drivers rather than the average citizen.

Three-wheeled automotive vehicles pose an additional problem owing to their small size relative to the size of the other cars on the roads they share. This is that the driver and passengers do not feel safe or confident unless they are seated relatively high off the road. To be seated low in traffic consisting of conventional cars results in an insecure feeling, deriving most likely from lack of visibility on the part of the driver and the knowledge that he is not conspicuous to other drivers. The achievement of stability in three-wheeled vehicles by the use of low seating and/or small wheels is limited by the regulatory laws mentioned above and by the need for the feeling of height on the part of the passengers and driver.

The need to provide a covering for the passengers as protection against the weather complicates the problem as a structure above the heads of the passengers will tend to elevate the center of gravity by adding weight at a relatively high point.

An additional problem relative to the stability of three-wheeled vehicles is that created by the different situations of balance created in having either one or two passengers aboard, especially if the seating is side by side. The invention addresses itself to this problem as well.

The invention further comprises a series of mechanical features intended generally to lower the center of gravity by reducing the weight of components located at high points on the machine. One of these features is the use of heavy electric storage batteries whose weight is used to adjust the center of gravity and which serve also as the source of energy for the vehicle.

This use of electric storage batteries introduces a further problem, that of providing sufficient energy storage capacity to offer enough range of driving between recharges of the batteries commensurate with practical needs. Numerous electric vehicles exist today. They consist of full sized four-wheeled electric automobiles weighing thousands of pounds, as well as smaller three-wheeled vehicles used as off-road utility vehicles or golf carts. Even these tend to weigh upward of several thousand pounds. There are none used generally on the road for regular transportation due to their general impracticality concerning range, cost, utility, and stability. These problems arise from the need to supply energy storage capacity sufficient to move the weight of the vehicle and its load by means of electric storage batteries which themselves are so heavy as to contribute substantially to the load. They also require heavier chassis construction merely to support them.

It is an object of the invention to provide a unique and improved vehicle which solves the above problems by means of a series of mechanical arrangements which deal simultaneously with the problems of stability, passenger placement, conformity to road statutes as well as problems intrinsic in electric drive, such as energy storage capacity power, and so forth.

A number of three-wheeled vehicles are known such as, for example, disclosed in French Pat. No. 1,011,087, and in U.S. Pat. No. 3,117,648. The vehicles shown in the Landers U.S. Pat. No. 3,117,668 is an electrically powered vehicle having interconnected power and brake controls. This vehicle is provided with a chassis having a driver's compartment portion with speed and braking controls being mounted on the chassis and wheel mounting axle supports are secured to the forward part of the chassis. A frame is pivotably connected to an intermediate part of the chassis and extends along the rear part thereof. A spring system supports the rear part of the chassis on the frame and a power unit mounted on the frame comprises a sealed casing with a differential therein. Wheel mounting axle members project sidewardly from the differential through the casing and are journaled in the frame. An electric motor is carried by the frame and powers one of two counter shafts. A motor control device is mounted on the casing with brake means being connected to the casing and being mounted on the other counter shaft, there being further provided actuating devices for the brake means and a transmission in the casing interconnecting the brake actuating device and the controls whereby the speed of the electric motor is reduced in response to the actuation of the brake.

French Pat. No. 1,142,921 and the Michael U.S. Pat. No. 3,284,130 show windshields with the Michael patent further showing what might be regarded as constituting a canopy. Specifically, the Michael patent discloses a windshield and spray shield construction which comprises an upright windshield frame with devices securing the frame to an upper portion of the front end of the main frame of a motorcycle. The construction also includes devices defining a pair of support arms projecting rearwardly and downwardly from opposite side portions of the lower end portion of the windshield frame. The main frame of the motorcycle includes forwardly and upwardly inclined forward portions from whose upper end the front wheel assembly is pivotably supported. An upstanding flexible spray shield is secured between the aforesaid arms and is passed over the forwardly and upwardly inclined portion of the main frame. The support arms generally parallel the forwardly and upwardly inclined portion of the main frame and are disposed forwardly of the upwardly inclined position.

The prior art fails to reveal a three-wheeled lightweight vehicle with an advantageously positioned center of gravity as is provided in accordance with the invention and as will be discussed in greater detail hereinafter.

SUMMARY OF INVENTION

It is an object of the invention to provide an improved three-wheeled vehicle.

It is another object of the invention to provide an improved lightweight vehicle adapted for being propelled by electric power and particularly by one or more storage batteries.

It is another object of the invention to make appropriate use of the weight of the aforesaid storage batteries for purposes of defining and locating the center of gravity of the improved vehicle of the invention in order to provide for appropriate seating of the driver and/or passengers of the vehicle.

It is still another object of the invention to provide for appropriately advantageous seating of the driver and passengers of the improved vehicle of the invention in such manner that the driver and passengers are given a particular sense of security and feeling of conspicuousness so that a feeling of protection and safety is conveyed.

Yet another object of the invention is to provide an improved weight distribution in three-wheeled vehicles whereby passengers and drivers thereof may readily perceive surrounding situations such as traffic and hazards and the like for purposes of improved safety.

It is still another object of the invention to provide an improved three-wheeled vehicle driven by electric power or the like which is readily susceptible of coming within the provisions of governmental regulations and the like covering various safety and operational aspects of motor vehicles and limiting the extent and purpose for which such vehicles may be used.

Still another object of the invention is provide an improved braking system to accommodate the utilization of additional weight which is employed in the improved vehicle of the invention for purposes of locating the center of gravity.

It is still another object of the invention to combine mechanical and electro-magnetic braking techniques to provide an improved braking system of utilization in the improved vehicle of the invention.

Still another object of the invention has to do with the provision of a lightweight improved structure constituting a canopy for purposes of providing shelter for drivers and passengers without substantially affecting the advantageous location of the center of gravity thereof.

In achieving the above and other objects of the invention, there is provided in accordance therewith a vehicle comprising frame means adapted to support at least one passenger (or driver), a source of power, three wheels on and supporting said frame means for ground traversing movement, and an electric motor coupled to and driving at least one of said wheels and being coupled to and driven by said source of power, said source of power being located relatively low in said vehicle and constituting a substantial portion of the weight of the vehicle whereby to define for the vehicle a relatively low center of gravity.

In accordance with the invention, the center of gravity with the vehicle unloaded is no more than about 13 inches above the ground, or, in other words, is in the approximate vicinity of the height of the vehicle supporting wheel axles relative to the height thereof.

In accordance with a feature of the invention, passenger seating is provided at a height of about 26-32 inches above the ground, the center of gravity with the vehicle carrying a passenger load of about 400 pounds being no more than about 28 inches above the ground.

In accordance with a further feature of the invention, the source of power of the vehicle includes a battery pack constituting at least about one-third of the weight of the unloaded vehicle, and being so positioned that the center of gravity is located in accordance with the aforegoing discussion thereof. The battery pack may include one or two and possibly more lead-acid storage batteries with the total weight of the battery pack being, for example, about 110 pounds plus or minus 30 pounds.

In further accordance with features of the invention, the three supporting wheels include two wheels arranged in parallel with each other and located to the rear of the third or front of said wheels with the battery pack being located closer to the parallel wheels than to the front wheel. In addition, it is possible in accordance with a further feature of the invention that the battery pack be located at least partly between the parallel wheels.

In accordance with the invention, the vehicle is preferably such as to define a longitudinal axis with its steering column being connected to the front wheel and located generally on this longitudinal axis, the steering means being coupled to the steering column and centered about an axis which is spaced laterally from the longitudinal axis.

As has been indicated hereinabove, the invention features a lightweight canopy including a framework of hollow tubing and plastic sheeting on this framework to provide an enclosure for the passengers.

As has also been mentioned hereinabove, a feature of the invention relates to a braking system for braking the vehicle, inclusive of the additional weight of the battery pack, said braking system including both mechanical and electro-magnetic brake systems cooperatively operable.

According to one specific aspect of the braking system, there is employed a braking light and a braking light circuit coupled to said light when the braking system is operated, the braking system including means for electro-magnetically braking the vehicle by the use of current supplied for operating the braking light.

According to another specific feature of the invention, the aforesaid steering means includes a yoke provided with two handles, the braking means including levers upon the handles to control the mechanical brakes and rotary members on the handles to selectively actuate the batteris and electro-magnetic brakes.

To meet certain specific requirements of the vehicle of the invention, there may be provided, in addition to the above, pedals mounted on the framework and coupled to at least one of the wheels to supply motive power thereto.

According to the power and braking system aspect of the invention, there is provided an electric motor having two terminals and adapted upon energization to supply rotary power, a plurality of storage batteries connected in series or parallel to the motor and control means closing a circuit between a selected number of said batteries and the other of said terminals of the motor.

As has been indicated hereinabove, the power and braking system of the invention may include a short circuiting system to short circuit the electric motor whereby the motor locks in position and constitutes an electro-magnetic brake. There will also be provided in accordance with the invention mechanical braking means, and a braking light to indicate when said mechanical braking means is working, said control means including controls for operating said mechanical braking means, said controls being coupled to said short circuiting system for actuating the same.

According to yet another aspect of the invention, the control means may include a plurality of electrically controlled switches coupled to the other said terminal and to respective of said batteries, and, upon actuation, coupling a selected number of batteries in closed loop with the aforesaid motor. An adjunct of the invention is the application of a reversing switch coupled to the closed loop to reverse the direction of rotation of the motor. A still further feature involves the use of resistances to buffer the short circuiting of the motor to prevent too sudden of a stop.

The electrically controlled switches referred to above may include a coil, an armature controlled by said coil, and a mechanical switch operated by said armature, and including normally closed and normally open contacts. The normally closed contact of one of the electrically controlled switches is coupled in series with the coil of another of the electrically controlled switches, said control means including control switches selectively to couple one of said coils to at least one of said batteries whereby to open the normally closed contacts thereof and close the normally open contacts thereof. The normally open contacts of the mechanical switches are coupled between said other terminal of the motor and respective of the aforesaid batteries. Said control means may include first and second single-pole single-throw switches operable in sequence and including normally closed and normally open contacts, the normally closed contact of the first switch being connected in series with the controls for the mechanical braking system to permit actuating said short circuit system. The normally open contact of the first switch is coupled to the pole of the second switch and the contacts of the second switch are coupled via the normally closed contacts of the electrically controlled switches to respective of the windings of the electrically controlled switches.

In further accordance with the invention there is provided a method of supplementing the mechanical braking of a vehicle driven by an electric motor as set forth hereinabove. This method will comprise short circuiting the electric motor to bring the same to a locked condition, thereby supplementing the mechanical braking. The invention may according to a feature of the method involved buffering the short circuiting in order to ease the locking conditions.

Yet another aspect of the method of the invention comprises operating in relationship to the application of voltage to the motor to actuate the same, and, specifically, reducing the voltage thereby causing the motor to function in part as a generator and to provide a supplemental braking action.

As has been mentioned hereinabove, the invention also relates to the provision of a lightweight superstructure or canopy for the sheltering of passengers inclusive of the vehicle driver. The canopy of the invention comprises according to a preferred embodiment thereof spaced and parallel tubular frame parts of inverted generally U-shaped configuration, transverse connecting members connecting the extremities of these parts such that the U-shaped parts include bight portions resiliently deflectable towards each other, and at least one flexible cover portion mounted under tension between said bight portions.

According to various features of the lightweight superstructure of the invention, the parts include front and rear posts inclusive of the aforesaid extremities and there is provided a transparent windshield extending between and connected to the front posts. Additionally, horizontal tubes are provided which extend rearwardly from the extremities of the front posts to define door frames therewith. Doors are provided in the door frames, each said door including a generally polylateral frame and a flexible transparent sheet on and closing the polylateral frame. Hinge clips are provided on the polylateral frames and are hingeably employed to couple the doors to the front posts.

According to still a further feature of the invention, tusk-like members are provided on the transverse connecting members for attaching the canopy to the vehicle in the manner of a clamping jaw. Moreover, struts are provided which extend across the doors to brace the transparent sheets thereof. It will be noted that the struts are positioned approximately midway relative to the height of the door, and the transparent sheets of the door are foldable over the same to form window openings.

According to still other aspects of the invention, the windshield is provided with an upper edge and first Velcro means are provided on and extending along the upper edge with second Velcro means being provided on the cover portion for lockingly engaging the first said Velcro means.

According to yet a further feature of the invention, a canopy apron is positioned below the windshield with Velcro strips being provided on the apron to hold the same removably on the aforesaid front posts. The canopy apron will be provided preferably with a vertical downwardly open slot to accommodate the steering column of the vehicle.

The above and other objects, features, and advantages of the invention will become apparent in the detailed description of a preferred embodiment which follows hereinbelow and which will be illustrated in the accompanying drawing.

BRIEF DESCRIPTION OF DRAWING

In the drawing:

FIG. 3 is a side view of the vehicle of the invention taken from the side opposite to that illustrated in FIG. 3;

FIG. 4 is a front view of the vehicle of the invention;

FIG. 7 illustrates a modified detail of the vehicle in accordance with a second embodiment of the invention;

FIG. 8 is a sectional view along line VIII—VIII of FIG. 7;

FIG. 9 is a diagrammatic view illustrating certain steering improvements which result from the modification illustrated in FIGS. 7 and 8;

FIG. 13 is an exploded view of the lightweight canopy employed in the vehicle of the invention;

FIGS. 14, 15, 16, 17, and 18 illustrate cross-sectional details in the connecting of the various parts illustrated in FIG. 13;

DETAILED DESCRIPTION

Figure 1:
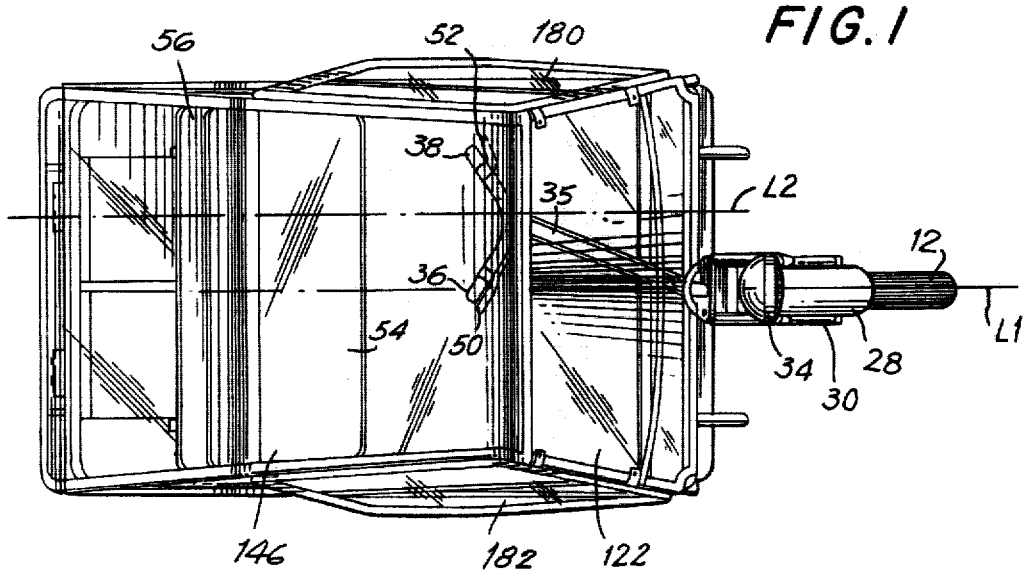
FIG. 1 is a top view of a three-wheeled vehicle provided in accordance with the invention.

In accordance with the invention, there is provided a vehicle which seats two passengers side-by-side at a height of about 26 inches above the road with sufficient stability for ordinary driving, powered by electric storage batteries which provide a driving range of, for example, 30-50 miles at 20 miles per hour. The vehicle weighs, for example, 300 pounds including the batteries.

In addition to the above-stated practicality of the vehicle, its small size and low weight result in extreme efficiency of use and the possibility of a low cost of manufacture. Another advantage is that the manufacturing process itself consumes relatively little energy. Expensive or scarce raw materials are used at a minimum. The invention has a special practicality and social value in a society of low energy availability.

The vehicle of the invention is a tricycle-like automobile with, as mentioned previously, seating for two passengers, side-by-side. The seat is placed about 26 inches above the road bed. The eye level of the driver is thereby elevated above the roof of other cars on the road and the driver will sense a feeling of conspicuousness. The passenger feels safe for similar reasons.

It has been found that a high degree of stability can be achieved in a small three-wheeled vehicle by arrangement of heavy weight components such as batteries and motor, which are slung underneath the chassis. Even in the case of a vehicle with a protective covering structure, sufficient stability has been found to be gained thereby as to permit, for example, a ninety degree turn at 16 mph of 47 feet radius with two passengers aboard such that the inboard wheel does not lift off the ground due to centrifugal force.

As will be shown and discussed relative to the drawing, the center of gravity of the vehicle is at a point 15-18 inches above the ground with two heavy people therein (e.g., about 200 pounds each). This is due to the low disposition of the two lead-acid storage batteries which are used and which have a combined weight of 100 pounds, and of the electric motor which weighs about 20 pounds. The curb center of gravity (with no passengers) is about 13 inches above the ground. The same vehicle powered by an internal combustion engine weighing 30 pounds has a center of gravity 18 inches above the ground. This vehicle can perform the above-mentioned turn at 13 miles per hour.

The stability problem of the three-wheeled vehicle is compounded in case the same vehicle is intended for use by one or two people, especially if they are seated side by side, as this shifts the load. With two people aboard, the weight load is distributed relatively symmetrically about the longitudinal axis of the vehicle. However, the steering apparatus must be conveniently available to the driver who sits generally on the left. If there is no passenger, the driver gains better stability by sitting in the middle of the seat thus restoring symmetrical weight disposition. However, he must still have convenient access to the steering apparatus. It has been found that the type of steering column described below uniquely provides convenient access regardless of whether the driver is sitting to the left or in the middle. More specifically, the steering column with handles and controls is placed in a position halfway between the extremes of the lefthand position and the middle position. Although this placement is not ideal for either of the two seating positions, it uniquely makes the difference in displacement in both cases sufficiently small so as to prevent inconvenience to the driver and to contribute synergistically to the balance. Thus, the driver is given the additional choice when driving alone of placing himself in a position halfway between left and center and thereby directly behind the steering post. In this position, the stability of the vehicle is sufficient to make the above-described ninety degree turn at the prescribed speed with the same result; that is, the inboard wheel does not lift during the turn. When sitting to the left in such a turn, the driver tends instinctively to shift the weight of his body to the right in response to an instinct to maintain stability. The need for this uncomfortable movement is substantially obviated when he sits closer to the middle, a position made possible by the offset placement of the steering apparatus.

The vehicle of the invention can, moreover, be provided with a canopy-like covering to serve as protection from the weather. A problem which might be created by the use of a canopy is the strong effect upon the center of gravity of such a structure located at a high point on the vehicle. The canopy, provided in accordance with the present invention, consists of a framework comprising of a pair of structures made of bent, lightweight steel tubing. The structures are separated by elements perpendicular thereto, which serve to space them and attach them to each other so that they form a framework to support a windshield in the front of the vehicle as well as a sheet of clear, thin gauge flexible plastic material which is attached to this frame in a manner which tends to stretch it taut so as to provide a pleasing appearance as well as good optical properties. It is found that polyvinyl chloride of thickness ranging from 0.006" to 0.010" has the correct flexibility to maintain a proper taut configuration during the driving of the vehicle so as to avoid slack which would result in flapping and poor visibility as well as ultimate wear. Tautness is maintained by a combination of the flexibility of the tubing and that of the plastic sheet. When installed on the frame, one side of the tubing is caused to bend toward the other during the attachment, and held in that position until released when the vinyl is attached. In this way, the tension resulting as the tubing seeks to regain its normal, unbent position, places continuous tension on the vinyl in a lateral direction.

The attachment of the vinyl is done by means of "Velcro" which makes an attachment which can be accomplished quickly using no special attachment devices or contrivances other than its own structural connection which can as well be undone quickly. The vinyl wraps around the tubing and the two parts of the Velcro system conventionally attach to each other in such a way that the tubing is protected from the elements and the visual effect created by the Velcro strips constitutes a pleasing decorating effect.

The natural flexibility of the structure is used to attach the canopy to the vehicle. The ends of both sides of the canopy are disposed inwardly in such a way as to enter sockets which are attached to the frame of the vehicle. The terminal ends of the canopy can be stretched apart from each other so that clearance is caused for the ends to enter the sockets. Upon being placed in a position opposite each socket, stretching tension is released and the natural tendency of the tubing to regain its form causes it to enter the sockets. By this means of attachment, a person of little mechanical ability can attach or detach the canopy with the use of no tools or special attachment devices whatsoever in a short period of time. In this way, the vehicle is converted from an open vehicle to one bearing a weather-protecting enclosure.

It has been found that a canopy such as described above, retains its shape and mechanical integrity in ordinary driving use despite the tension placed on it by wind and by vibration resulting from travel on ordinary roads when the framework is constructed of steel tubing ranging from ⅜ to ⅞ inches in diameter with a wall thickness of 18 through 14 gauge. These diameters and wall thicknesses moreover provide flexibility of the correct degree to allow for deforming during the process of installing the vinyl top and during attachment of the frame to the vehicle and for the return after these installation procedures to original form. The canopy weighs only about 26 pounds and thereby is responsible for the raising of the center of gravity by only 6–7 inches together with the load.

It was discovered further that the typical mechanical braking system normally used on a vehicle the size and weight of the subject vehicle become marginal upon the addition of the batteries and electric motor which are essential for providing stability as well as motive power.

To overcome this difficulty, the electric motor is utilized as part of the braking system. Upon creating a substantial short circuit across the terminals of the motor while the motor is rotating, the internal magnetic forces cause the motor to slow, thereby effectively slowing the vehicle. It has been discovered that the additional braking power available thereby is, when added to the normal size mechanical braking system, adequate to provide the braking system of the vehicle thus making up for the need for additional braking capacity as otherewise would be caused by the added weight of the batteries and electric motor. Another feature relating to braking by utilization of electric motor characteristics will be described hereinafter.

Further, it has been found that the braking effect caused by nearly shorting the motor can be conveniently applied by a system of control solenoids which are energized by electrical switches attached to the hand grips of the mechanical brake system which is used as well. In addition, it has been discovered that the ideal moment to apply the electric brakes occurs at the same moment that the mechanical brakes are being applied. This can be automatically accomplished without the operator's having to perform some extra operation. Furthermore, the braking effect of the motor minimizes the need for strength in the hands of the operator as he squeezes the brake actuating grips. It is thus found that older or infirm people are capable of using the vehicle who otherwise might not have sufficient strength of grip to provide sufficient braking force for the mechanical braking system alone.

It has also been found that the existing switch mechanism which actuates the brake lights can be utilized to actuate the electric brakes as well in such a fashion that the mechanical brakes and the brake lights and the electrical brakes can all be applied by the operator automatically, each function occurring at the correct time with respect to the need to effectively stop the vehicle and indicate the intention to do so to others by means of the warning lights. The use of this combination braking system obviates the need for larger mechanical brakes which would have otherwise been necessitated by the weight of the batteries and electric motor.

Provisions are further made upon the canopy frame for the attachment and detachment of hinged side panels acting as doors to protect the passengers from weather conditions. These consist of frames made of bent lightweight steel tubing ⅜ inches in diameter upon which is attached clear polyvinyl chloride sheet material of 0.006"–0.010". These are attached by means of a pair of attached downwardly disposed steel hingepins which enter a corresponding pair of steel tube sections which are attached to the doors of the vehicle. These panels or doors create a relatively exact fit with the frame. It has been discovered that these panels provide protection to passengers against rain and cold despite a possibly inexact fit as air does not tend to enter the interstices thereby formed while the vehicle is in motion, due to the effect of the currents of air streaming around the vehicle while it is in motion. This tends to create a negative pressure around these interstices which tends to prevent the air from entering. This permits the use of a very light construction of door panels which, although possibly incapable of a tight seal, are nonetheless effective for the reasons above mentioned. They are, moreover, of extremely light weight, being only about seven pounds each.

The vehicle of the invention can be equipped with a pair of attachable flaps of clear PVC. These are attached behind the door panels, where they create a loose fit offering additional protection against the weather. It has been found that, when the vehicle is equipped with the above-mentioned panels and flaps, the passenger is kept sufficiently warm as to be comfortable enough on a relatively cold day without the use of supplementary heat. This effect is caused by the insulating effect of the stillness of the air within the enclosure formed by the canopy and the side panels. The enclosure being relatively small with respect to the size of the occupants, the body heat is retained within in an amount sufficient to create an atmosphere of comfort. The entry of direct sunlight has the tendency to enable the entrapment of radiant heat by means of the so-called greenhouse effect which is heightened by the transparency of the canopy top and the side panels which permit the passage of heat in the form of infrared radiation. In the absence of these heating effects, the use of a supplementary electric heater would substantially reduce the energy efficiency of the vehicle thereby reducing its range.

FIGS. 1-6 illustrate an electrically propelled three-wheeled vehicle provided in accordance with the invention. In these figures, the vehicle is indicated generally at 10, and it will be seen that the vehicle includes a front wheel 12 and two rear wheels 14 and 16, these wheels are of the same size and having a diameter of, for example, 20 inches. The tires on these wheels are conventional air-inflated tires fabricated of rubber or the like, but the nature and size of the tires is not particularly limiting of the invention disclosed herein. It will be noted that the tires are mounted on rims 20 held by spokes 22 on a central hub 24, each tire having an axis of rotation such as generally indicated at 26.

It will be noted that the front tire is provided with a mud guard 28 and that the front tire is straddled by a yoke 30 constituting part of a steering column 32 bearing a headlight 34. The steering column has connected thereto a steering rod 35 having mounted thereon handles 36 and 38, the positions of which will be described in greater detail hereinbelow.

A chassis is provided for the vehicle consisting in part of horizontal tubes such as indicated at 40. The source of power of the vehicle is indicated at 42 and is constituted, for example, by a battery pack which is suspended below the chassis. The relatively low positioning of the battery pack constitutes a feature of the invention in conjunction with other weight distribution as will become more apparent hereinafter. It will be noted that the battery pack may be constituted by way of example of two lead-acid storage batteries, each capable of providing 12 volts. It will also be noted that these batteries will be of the rechargeable type with appropriate provision being made for recharging the same with an anticipated charge use of, for example, 25 to 50 miles range being anticipated. The capacity of the batteries is, however, not a limiting feature of the invention as the state of the art with respect to such batteries may be rapidly developing during the course of the life of this patent. Mounted adjacent the power pack 42 is a DC electric motor 44 which converts the power of the battery pack 42 into rotary power. This power is transmitted to the shaft of wheel 16 by means of a chain 46 connected to a sprocket 48 (FIG. 6) in conventional manner. As will be seen hereinafter, a rotary switch provided on handle 36 permits selectively connecting one or both of the batteries in power pack 42 to the motor 44 thereby altering the speed at which the vehicle can be driven. As will also be seen, this rotary switch operates in conjunction with hand brake levers 50 and 52 which function through respective cables to apply mechanical braking systems to the front wheel 12 and the rear wheel 14.

Mounted above the rear wheels 14 and 16 is a seat 54 having a back 56 associated therewith. The seat 54, as can be best viewed in FIG. 1, is of a width which is adapted to accommodate at least two passengers inclusive of the driver. The top of the seat 54 is a distance D1 above the ground, the distance D1 preferably being in the order of about 26 inches above the ground, thereby affording to the driver and passengers substantially unlimited vision while at the same time affording to the driver and passengers an extreme sense of security and of being conspicuous to drivers in surrounding vehicles so that a tremendous sense of safety is afforded.

Hereinabove reference has been made to the weight of the battery pack 42 and to the fact that the curb center of gravity (i.e., with no passengers) of the vehicle 10 is about 13 inches above the ground. With two passengers in the vehicle of fairly large magnitude of weight, there will be added to the vehicle a load of approximately 400 pounds. This means that the center of gravity will be somewhat raised. However, the center of gravity is not raised beyond a limit of about 28 inches above the ground thereby maintaining the type of stability deemed necessary in accordance with this invention. Consequently, as will be referred to hereinafter, the vehicle is capable of making turns of relatively small radii at relatively high speeds without any of the wheels of the vehicle lifting off the ground.

The vehicle of the invention is furthermore provided with a relatively lightweight superstructure or canopy such as generally indicated at 60. The lightweight superstructure is fabricated of hollow tubing and plastic sheeting or the like, thereby contributing only a minimal amount to the weight of the vehicle. Accordingly, the weight of the passengers is a major contributing factor to the displacement of the center of gravity aside from the influence afforded by the particularly advantageous inclusion of the power pack 42 and the weight thereof.

In the preferred embodiment of the invention, the unloaded vehicle may weigh, for example, 300 pounds including the batteries. The batteries will weigh in the vicinity of 100 to 110 pounds, thereby constituting approximately one-third of the weight of the unloaded vehile. When the vehicle is loaded with two substantially large passengers, approximately 400 pounds will be added to the weight, thereby making an aggregate weight of approximately 700 pounds. This weight is appropriately distributed as has been noted hereinabove to maintain the center of gravity relatively low while combining therewith the particularly advantageous disposition of the passengers to achieve the benefits which have been discussed. Thus, in accordance with the invention, the battery pack is suspended under the floor board of the vehicle so that this will lower the center of gravity of the vehicle by an amount substantially more than would be achieved in gasoline-powered vehicles. This is explained by the difference in weight between the gasoline engine and the battery pack and electric drive motor 42. A gasoline engine adequate for driving a vehicle of the noted type weighs approximately 25 pounds. On the other hand, an electric motor weighs 25 pounds, with the battery pack weighing approximately 100 to 110 pounds. Thus, the use of the battery not only provides a desirable substitute for a fuel-consuming engine, but, in addition, it adds a net weight of approximately 110 pounds to the structure whose center of gravity is then roughly 13 inches from the ground. Simple mathematical calculations based on centrifugal force will show that for any given maneuver, such as turning, there will be more stability with the electrical vehicle described above than with the gasoline-powered vehicle.

The amount of stability, of course, varies with the weight of the passengers, but, in any case, the electrical vehicle will be more stable than the gasoline-powered vehicle, especially if the batteries are moved to the rear as will be discussed hereinafter.

The battery placement affords further benefits by having an effect on steering under dynamic road conditions when the vehicle is being turned to the left or to the right. Appropriate battery placement induces little or no side loads on the front wheel which is usually a problem on three-wheeled vehicles. It has been found that with the batteries placed midway between the front and rear wheels, the side loads on the front wheel are somewhat higher with a resulting scrubbing of the front tire when the vehicle is maneuvered sharply to the left or right. Judicious positioning of the battery pack even further toward the rear avoids this unexpected problem as will be shown.

As mentioned hereinabove, when two passengers are seated side by side, the weight load is distributed relatively symmetrically about the longitudinal axis of the vehicle. This longitudinal axis is indicated in FIG. 1 at L 1. However, if there is no passenger, the driver can gain improved stability by sitting in the middle of the seat, thus again achieving symmetrical weight distribution. However, he still must have convenient access to the steering apparatus. With this goal in mind, it has been found that a particular type of steering column uniquely provides convenient access regardless of whether the driver is sitting to the left as when he is accompanied by a passenger or in the middle where, for example, he may position himself when he is driving alone.

There is indicated at L 2 in FIG. 1 a second longitudinal axis which is parallel to but spaced from the longitudinal axis L 1. The axis L 2 constitutes the axis of symmetry for handles 36 and 38 of the steering apparatus of the invention. Longitudinal axis L 2 is positioned substantially midway between the planes of the wheel 12 and the wheel 16 of the vehicle, or, in other words, approximately midway between left and central planes of the vehicle and such that the driver may have appropriate access to the steering apparatus whether he is driving accompanied by a passenger or whether he is driving by himself and positioned closer to the central longitudinal axis of the vehicle.

Figure 2:
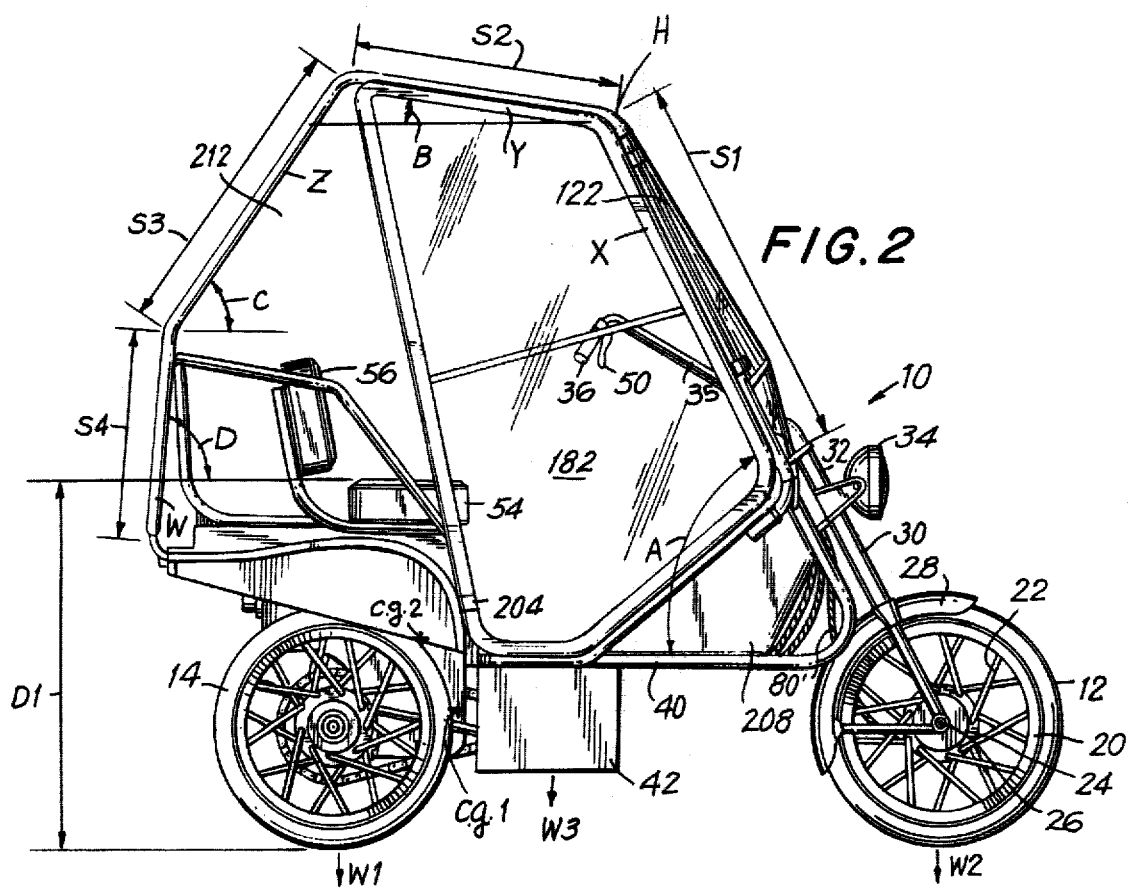
FIG. 2 is a side view of the vehicle of FIG. 1.
Figure 6:
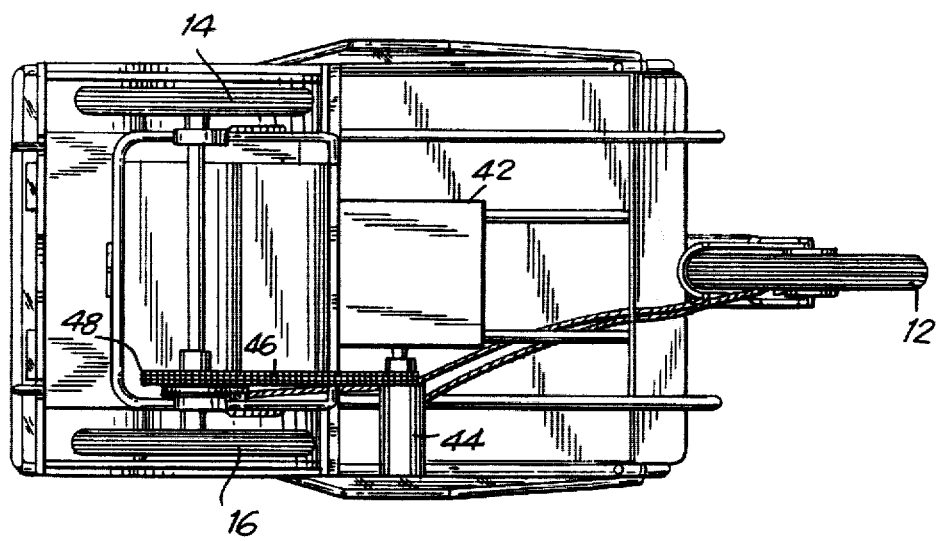
FIG. 6 is a bottom view of the vehicle of the invention.
Figure 5:
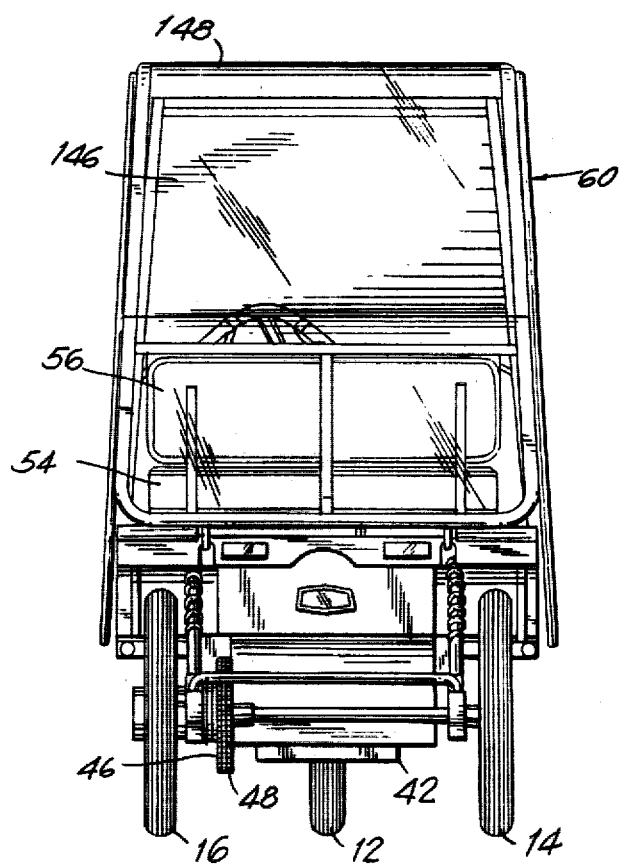
FIG. 5 is a rear view of the vehicle of the invention.

FIGS. 2 and 3 illustrate weight distribution in the embodiment illustrated in FIGS. 1–6. Assuming the weights which have been mentioned hereinabove and that the weight of the vehicle will be in the vicinity of 300 pounds, the weight distribution will be such that W 1 will equal approximately 170 to 200 pounds whereas the weight supported as indicated at W 2 will be approximately 100 to 130 pounds. The weight W 3 indicated at the battery pack 22 in FIGS. 2 and 3 will run approximately 100 to 120 pounds. This weight distribution has been found eminently satisfactory to achieve the various benefits noted hereinabove with respect to vehicles of the invention.

FIGS. 7 and 8 illustrate a modification of a portion of the invention whereby there are incorporated pedals 80 and 82. These pedals enable the physical rotation of sprocket 84, thereby enabling the driving of chain 86 to drive sprocket 88 coupled to the battery pack 42'. The sprocket 88 is driven either by power pack 42' or by the application of power to pedals 8 and 82, thereby providing for a driving of sprocket 90 and a rotation of shaft 42, thereby driving the wheel 94.

The provision of the pedals is to provide for emergency power in the event of failure of the batteries constituting pack 42' but are also intended to meet with legal requirements for mopeds in the event that pedals are required by definition in any of the statutes of the various states. It has been found that the provision of pedals has led to a further advantage which inures to the benefit of the invention. Due to the provision of the pedals, the battery pack 42 is moved rearwardly from the position indicated initially relative to power pack 42 in FIGS. 1–6. As is illustrated in FIG. 9, this adds to the stability of the vehicle, particularly in respect of turns as indicated by the radii R 1, R 2, and R 3. Power pack 42', in being positioned rearwardly, relocates the weight load distribution as between W 1 and W 2 (see FIGS. 2 and 3). This in turn removes weight from the front wheel 12, thereby facilitating turns through relatively small radii such as, for example, ninety degree turns at 16 miles per hour±five miles per hour at a 47 foot radius with two passengers aboard. The preferred condition is that the inboard wheel does not lift off the ground due to centrifugal force, and this is readily achieved in the qualitative design contemplated in the scope of the invention.

Figure 10:
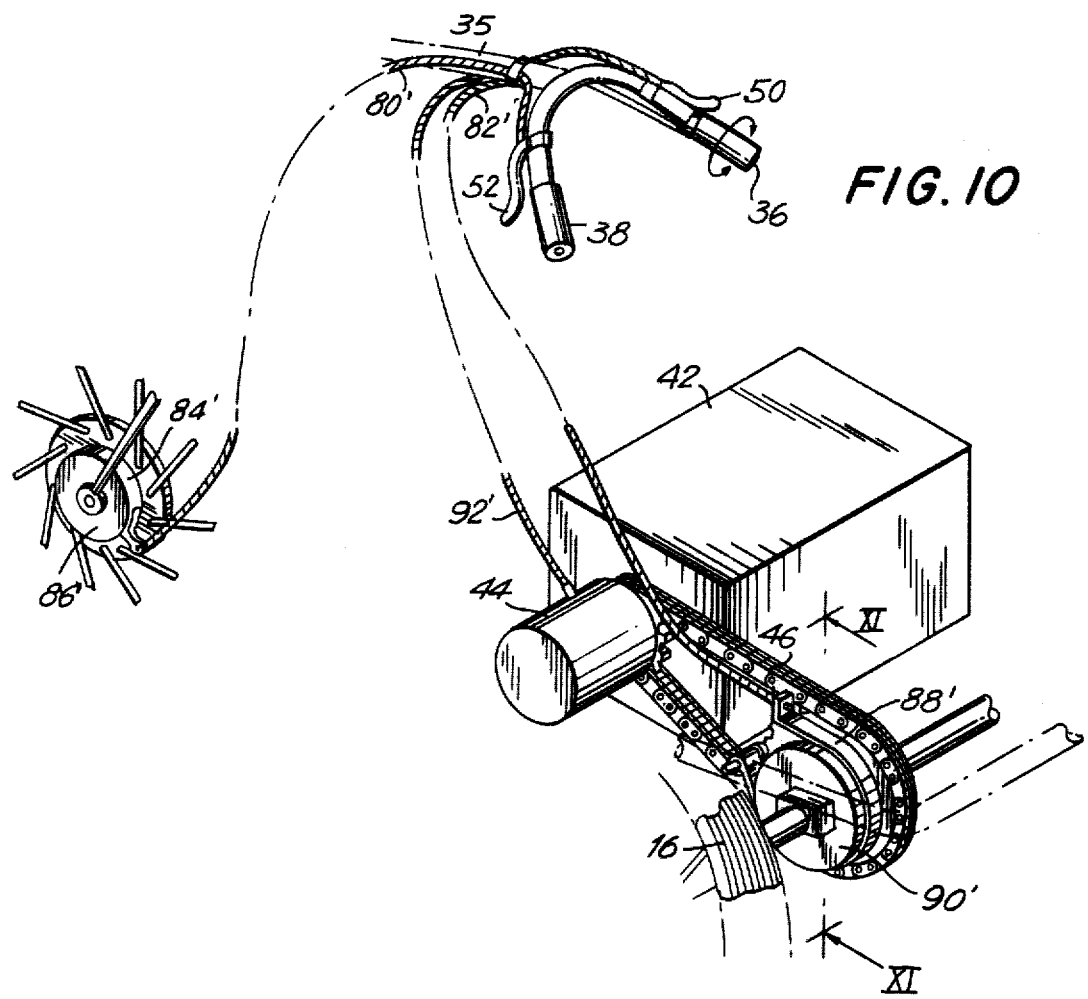
FIG. 10 is a perspective fragmentary view of the mechanical and electro-magnetic braking system of the invention.
Figure 11:
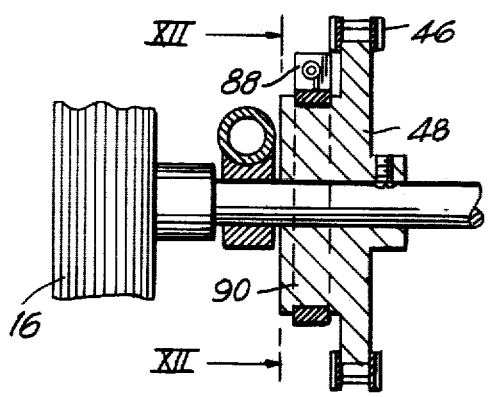
FIG. 11 is a sectional view taken along line XI—XI of FIG. 10.

FIGS. 10–11 illustrate a part of the braking system of the invention. Therein is seen the steering shaft 34 with the handles 38 and 36. Braking levers 50 and 52 are readily seen in FIG. 10. Lever 52 is connected to a cable 80' having connection to a band 84' which operates on drum 86' to brake the front wheel 12. Lever 50 has connection to cable 82' functioning to engage brake band 88' which operatively functions in conjunction with drum 90 to provide braking for the rear wheel 16. Motor 44 has connection to electrical cable 92' which is connected to rotary switch 94' constituting an adjunct to handle 36. The cable 92' functions to connect a twin switch operating in sequential mode in rotary member 94' to the remainder of the circuitry associated with motor 44 as will be described in greater detail hereinafter.

FIG. 11 shows the mounting of chain 46 on sprocket 48 as has been discussed hereinabove. FIG. 11 additionally shows the brake band 88' in operative association with drum 90' for purposes of braking wheel 16 as has been mentioned hereinabove. It is to be noted, however, that the braking band and the driving sprocket may advantageously be positioned on different wheels rather than on the same wheel as illustrated in FIGS. 10–11 and that the positioning of both of these members on the same wheel is not intended to be a limitation of the invention.

Figure 12:
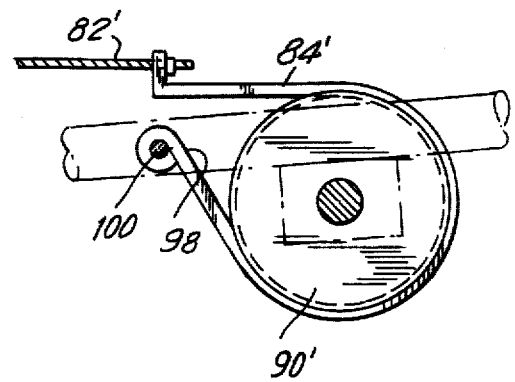
FIG. 12 is a fragmentary view taken in the direction of arrows XII—XII of FIG. 11.

FIG. 12 additionally shows the cooperation of the cable 82' with band 84' to apply frictionally against drum 90'. It will be noted that the end of band 94' indicated at 98 is mounted to a holding pin 100 for purposes of restricting movement of the end 98 of the band 84' so that the latter may be readily applied against drum 90'.

Cooperation with the electrical circuit will be hereinafter explained.

A lightweight canopy structure of the invention is illustrated in FIGS. 13-18. Herein can be seen two U-shaped tubular members 102 and 104, having the extremities thereof connected by transverse members 106 and 108.

Inverted U-shaped members 102 and 104 constitute jaws which include bight portions 110 and 112 and which tend yieldably to retain their illustrated shapes. To permit mounting the canopy on the vehicle, the jaws are forced open and then released and fit into sockets on the chassis.

U-shaped member 102 includes a front post 114 and a rear post 116. U-shaped member 104 includes a front post 118 and a rear post 120. These members are fabricated of tubular extrusions or of tubular steel of a size which has been indicated hereinabove. The bights 110 and 112 are resiliently deflectable towards one another so that upon a mounting of a plastic sheet thereon, the plastic sheet is upon release of the tubular bights placed under a tension so as to provide minimum optical distortion.

It will be noted that the canopy is provided with a windshield 122 formed of plexiglas or a suitable plastic which provides minimum optical distortion and is minimally susceptible to abrasion. This windshield 122 is mounted on the front post 114 and 118 by means of brackets 124, 126, 128, and 130. FIG. 16 shows that the mounting takes place by means of bolts 132 so that the windshield is settled rigorously in position.

Below the windshield may be optionally mounted a canopy apron 134. The canopy apron 134 is of either transparent or opaque material and is preferably of a suitable plastic such as PVC. The apron 134 may, for example, be provided with Velcro tabs and edge strips 138, 140 by means of which the apron is detachably mounted on the front post 114 and 118 which are provided with matching strips (not shown). It will be further noted that the canopy 134 is provided with a vertically downwardly opening slot 144, the purpose of which is to accommodate the steering column of the vehicle. Thus, the apron 134 may be mounted in position or deliberately omitted when it is desired to optimize the ventilation characteristics of the vehicle.

A canopy top is indicated at 146. This canopy top is preferably fabricated of PVC or the like and is of a sheet material whose thickness, for example, may be in the order of 0.006 to 0.010 inches. As has been noted hereinabove, this member is placed under tension by the resilient deflection of the bight portions 110 and 112, thereby affording minimal optical obscurity. It will be noted that at the front portion 148 of the canopy top there is mounted a transverse Velcro strip indicated at 150. This Velcro strip is intended to cooperate in locking fashion with the corresponding Velcro strip 152 at the upper edge 154 of the windshield 122. The connection is best seen in FIG. 14 wherein appears canopy top 146 and Velcro strips 150 and 152. The plexiglas windshield is indicated at 122 as is the front post 128.

Extending downwardly from transverse member 108 are tusk-like members 160 and 162, the purpose of which is to provide for attachment of the lightweight superstructure to the chassis of the vehicle of the invention. Tusk-like members 164 and 166 extend downwardly from transverse member 106 of the canopy framework. These tusk-like members also provide for connection of the canopy to the vehicle proper in connection with the closing of the jaws as mentioned above.

Horizontal members 168 and 170 extend rearwardly from members 160 and 162 and thus from the lower extremities 172 and 174 of the front posts 114 and 118. These horizontal members 168 and 170 form with the U-shaped members door frames in which are accommodated doors indicated generally at 180 and 182. The doors 180 and 182 are provided with a framing constituted by a quadrilateral or polylateral frame constituted either by tubing or by a lightweight metal framing. Supported on this tubing or framing is a transparent plastic indicated, for example, at 184 and 186, these being braced by means of a strut 188 or a strut 190 respectively. These struts are fabricated of a lightweight metal such as aluminum or thin steel and constitute hand grips for engaging the doors for opening and closing of the same. It should be noted that the plastic sheets 184 and 186 are detachably connected onto the associated tubing or framing by means of Velcro tabs or Velcro grippers or the like. This permits a detaching of the upper halves of the sheets 184 and 186 for folding over struts 188 and 190 thereby to form in the doors upper window openings constituting the upper halves of the respective doors.

The doors are connected to the front posts 114 and 118 by means of hinge pins indicated in FIG. 15 generally at 200 received in hinge pockets 201. Also visible in FIG. 15 is the windshield 122 and, for example, door 180; the hinge pin 200 engages socket 201 on front post 114 for rotary movement thereabout to provide for movement of the door 180 from the closed position shown in solid lines to the open position shown at 180' in dotted lines. As has been mentioned hereinabove, the framing of the doors may be of tubing or channeled material or the like in which the plastic of the door is retained and which imparts to the plastic sheeting of the door appropriate strength for configuration maintenance.

Tabs 202 and 204 are provided on the doors 180 and 182. These tabs are adequate for maintaining the doors closed in the various usages to which the invention will be applied.

Referring again briefly to FIGS. 2 and 3, it will be seen that complementary side portions 208 and 210, which may be fabricated of metal or plastic sheeting or the like, cooperate with the doors to define further sections of the vehicle sides. Similarly, it will be seen that the rear portions of the vehicle at the sides thereof may be provided with sections 212 and 214 fabricated of plastic sheeting to constitute extensions of the door surfaces. It will also be noted that the U-shaped bights 110 and 112 of the framework of the canopy are also connected by a reinforcing plate 220. This reinforcing is further illustrated in FIG. 17 whereover rests the sheeting 146. FIG. 18 illustrates the sheeting 146 coupled to transverse member 160 either by a Velcro connection indicated at 222 or by a metal clamping indicated at 224.

The vehicle of the invention is powered by two 12-volt storage batteries connected to solenoid switches so that the operator can provide either 12 volts or 24 volts to the motor. There has been included in the circuitry of the vehicle of the invention dynamic braking which is accomplished essentially by short circuiting the drive motor by means of a solenoid activated by one of the brake levers. In addition, regenerative braking is provided when the operator throws the throttle control switches to the 12-volt mode after the vehicle has been running at its highest speed in the 24-volt mode. The braking action thus supplied is inverse to the speed differential between the 24-volt and 12-volt operation or the respective speeds thereof with the reduced speed causing the motor to operate at least partially as a generator.

Figure 19:
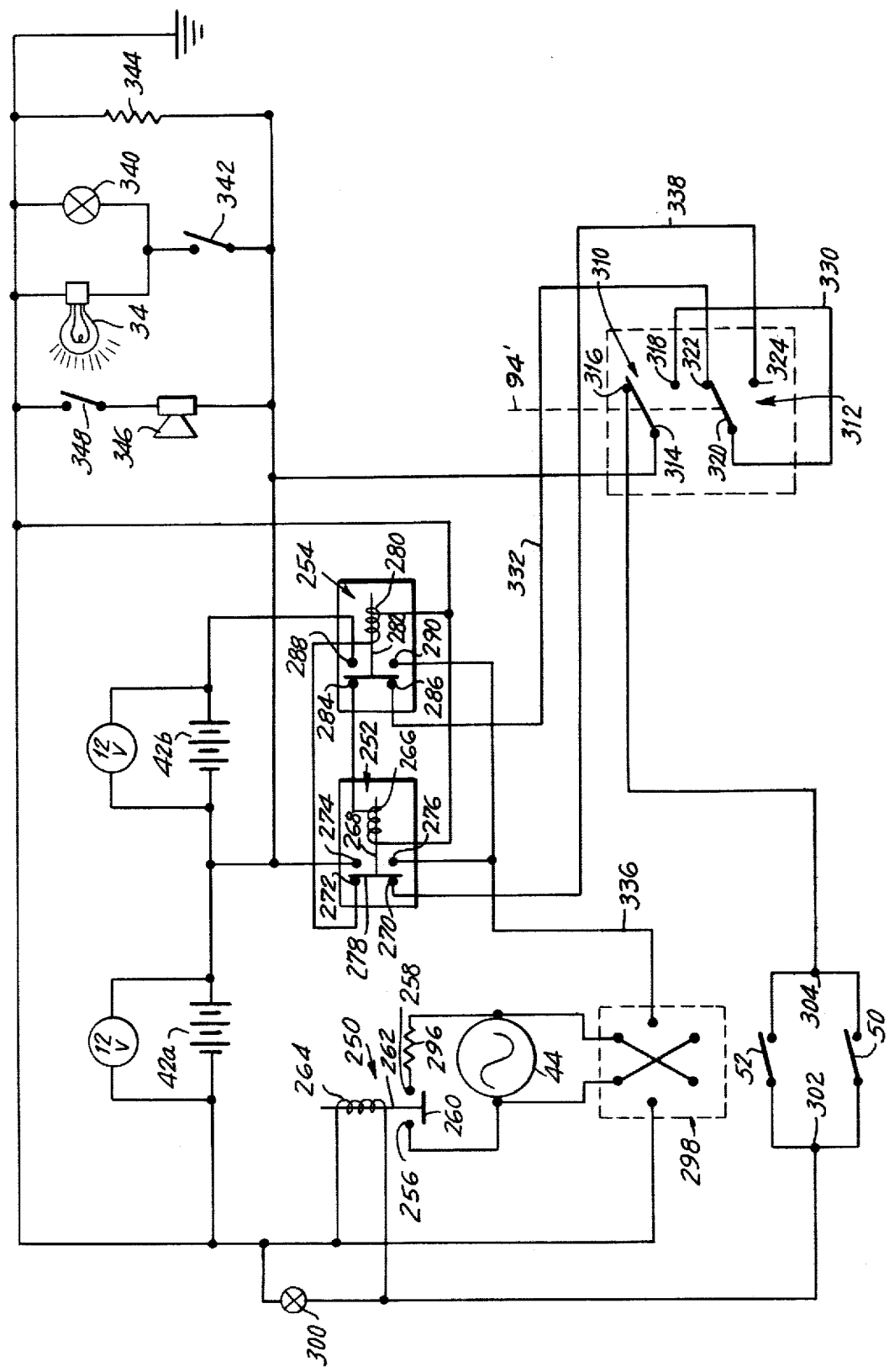
FIG. 19 is a schematic electrical diagram illustrating the combined mechanical and electro-magnetic braking system of the invention inclusive of the means of supplying power to the electric motor employed in accordance with the invention.

In FIG. 19 appear the brake levers 50 and 52 as well as the motor 44 and the battery pack 42. The battery pack 42 consists of two batteries 42a and 42b, these batteries being lead-acid storage batteries which are capable of being recharged.

Also included in the circuitry of FIG. 19 are solenoids 250, 252, and 254. Solenoid 250 is provided with two contacts 256 and 258 which are normally open but which are closed through switch 260 electro magnetically controlled through armature 262 by coil or winding 264. Solenoid 252 comprises a winding 266, an armature 268, and a first set of contacts 270 and 272, and a second set of contacts 274 and 276. Contacts 270 and 272 are normally closed through the intermediary of the switch 278 which when actuated by coil 266 and armature 268 opens contacts 270 and 272 and closes contacts 274 and 276. Solenoid 254 includes a winding 280, an armature 282, a first set of contacts 284 and 286, and a second set of contacts 288 and 290. Normally closed contacts 284 and 286 are opened upon actuation of winding or coil 280 whereupon contacts 288 and 290 are closed.

The motor 44 is connected in a loop which is closed when switch 260 bridges contacts 256 and 258. The loop thus formed is a short circuited loop with the exception that a resistor 296 is incorporated in the loop for purposes of buffering the short circuiting of the motor 44. The motor 44 is a DC motor of the permanent-magnet series wound type. When short circuited, the rotor of the motor is slowed electro-magnetically and tends to move to a fixed position thereby affording a dynamic braking to the wheel which is connected to the motor 44. This is one of the features of the invention as has been discussed hereinabove.

The circuit of the invention moreover includes a reversing switch 298. The purpose of this reversing switch 298 is to reverse the direction of rotation of the motor 44, thereby providing for driving the vehicle in forward or reverse direction.

The vehicle in the invention is provided with a brake light 300 which is connected in parallel with the winding 264 of the solenoid or electrically controlled switch 250. Thus, when power is supplied to the brake light 300, it is equally as well supplied to the winding or coil 264 for purposes of short circuiting motor 44 as described above. Power is supplied to the brake light 300 and to the winding 264 by either of brake levers 50 or 52 connected in parallel across terminals 302 and 304. It will be noted that connection of terminals 302 and 304 in the circuit is controlled by rotary throttle 94 in one of the sequential conditions thereof as will be explained hereinafter. For the present, it is adequate to note that application of power through switches or levers 50 and 52 is possible only when no voltage is being applied to the motor 44.

The throttle 94 works in conjunction with two single-pole, double-throw switches 310 and 312. Blade 314 selectively makes contact with contacts 316 or 318, whereas blade 320 selectively makes contact with contacts 322 or 324. The blades 314 and 320 work sequentially under the control of the throttle 94; that is, the blade 314 is switched from contact 316 to 318 during normal operation of throttle 94 and the operation of blade 320 follows sequentially, transferring the same from contact 322 to 324. When the throttle is in its normal position, power is fed through contact 316 and blade 314 to terminal 304 whereby power may be supplied to the brake light 300 and to coil 264 of relay or solenoid 250.

When blade 314 is transferred to contact 318, the power transmitted to contact 318 is transmitted via line 330 to blade 320 and thence via contact 322 and line 332 to contacts 286 and 284, and thence through the coil 266 of solenoid 258. As a consequence thereof, contacts 270 and 272 are opened by actuation of blade 278 and power transmission via line 334 to winding 280 of solenoid 254 is terminated or maintained in zero condition. This has the effect of coupling battery 42a via contacts 274 and 276 and line 336 to reversing switch 298 and thence to the motor 44.

When next blade 320 is transferred to contact 324, the power is transmitted via contact 318 and line 330 to blade 320 is transmitted via contact 324 and line 338 to coil 280, thereby opening contacts 274 and 286 and closing contacts 288 and 290. Thereby an additional battery 42b is coupled in series with battery 42a and power which is double that previously transmitted is passed via line 336 to reversing switch 298.

It will be noted that the throttle 94 is reversible whereby the batteries 42a and 42b are selectively and respectively withdrawn from connection to the motor 44. This reduces the voltage fed to the motor 44 from 24 volts to 12 volts in the first step as a consequence whereof the motor 44 works partially as a generator and affords a dynamic braking to the vehicle which thus does not have to rely exclusively on the mechanical braking system described hereinabove. This also constitutes a feature of the invention as has been previously noted.

The headlight 34 works in conjunction with a tail light 340, both of which are controlled by manual switch 342. Thus, the headlight and tail light may be selectively turned on simultaneously by the operator. An optional cigarette lighter 344 is connected between the terminals of one of the 12-volt batteries and is operated in conventional manner thereby.

Also available in the vehicle of the invention is a horn 346 with a switch 348 so that the horn can also be selectively operated. The horn is also connected across the terminals of one of the batteries, specifically the battery 42a.

In the aforegoing circuitry, it is to be noted that the relays 252 and 254 cannot be operated simultaneously. The amount of time necessary to turn the same off is greater than the time necessary to turn them on. A normal single-pole, single-throw relay will cause a dead short across one of the batteries, producing high current which freezes the relays and would probably burn out the battery or batteries connected in closed loop. Therefore, the relays are double-pole, double-throw in a preferred embodiment of the invention to throw the switches at different times. When the throttle is off, the normally closed side of the control switch provides power to the brake switch which can turn on the relay 252 to short circuit the motor 44. When the first side control switch closes from actuation due to operation of the rotary throttle 94, power is disconnected from the brake switch to prevent shorting of the motor. Power then goes to the other side of the control switch and the normally open side of the second stage of the control switch to the normally open side of relay 252, providing power to the coil of relay 254. This is 12 volts which is provided to the motor.

When the second stage of the control switch is actuated, power is broken from relay 254 and power is supplied to the normally open contacts of this relay. When relay 254 relaxes, power is then transmitted to relay 252 to deliver 24 volts to the motor 44. Thus, relays 252 and 254 cannot be energized at the same time and a possible shorting of the batteries is avoided.

While many of the features of the invention as pertains to construction and electrical circuitry have been described hereinabove, there remain to be discussed some very important features of the invention having to do with the construction and arrangement of parts as well as the mentioning of the various sections of the vehicle in order to obtain particulary improved results. Thus, for example, it will be noted that the framework in profile is divided into a plurality of sections indicated generally at X, Y, Z, and W. These particular sections have a synergistic relationship to each other and with the operation of the vehicle. Particularly, it will be noted that the front portion or section X is arranged at an angle A to the horizontal to make the portion X more nearly vertical than horizontal, whereas the section Y is arranged at an angle B to the horizontal which makes the same more nearly horizontal than vertical. Sections X and Y are generally to be considered as hingeably connected to one another. The vertical disposition of section X is selected in order to minimize the visual distortion which may occur due to the nature of the windshield and plastic employed to cover this part of the framework. Moreover, this arrangement functions to allow displacement of the hinge connection H from a position generally in front of the center of gravity c.g. 1 (and likewise the center of gravity c.g. 2) to a position which is still in front of the center of gravity but which is rearward of the position indicated. This change of position of the hinge H is effected when the vehicle is moving and is due to the wind resistance thereof. At the same time, the section Y is influenced by the wind resistance to force the same downwardly in a direction to produce a force which substantially passes adjacent the aforesaid centers of gravity. It will be noted that the center of gravity c.g. 1 is that center of gravity known as the curb center of gravity which has been discussed hereinabove for the unloaded vehicle. Center of gravity c.g. 2 is the center of gravity for the vehicle when it is loaded. The force exerted by wind resistance on the hinged top section Y of the framework of the vehicle operates to engage the wheels and particularly the rearmost wheels 14 and 16 of the vehicle more intimately with the ground traversed, thereby causing a much more effective traction to be generated for the vehicle and cancelling out slippage which would otherwise be the case if the load were to bellightened or in the absence of a wind resistance force.

Section W, which is one of the rear sections, is formed at an angle C which is less than the angle D of the section W. The purpose thereof is to permit an absorbing of the bending of the sections X and Y and to permit a bowing of these sections in order to absorb the effects of wind resistant forces. Specifically, the angles are as follows:

Angle A: 64° ±10%
Angle B: 8° ±10%
Angle C: 54° ±10%
Angle D: 94° ±10%

The length of the different sections are shown by way of example in the following table:
X: Distance S 1 = 42 inches
Y: Distance S 2 = 24 inches
Z: Distance S 3 = 26 inches
W: Distance S 4 = 18 inches The above dimensions taken in conjunction with the width of the vehicle canopy, which may be taken generally as 35 inches or approximately one yard, operates to enable a greenhouse effect to be achieved. In other words, for the volume of space which is sheltered by the canopy, there is sufficient area of transparent plastic to enable the temperature therewithin to be maintained at a relatively comfortable level despite the possibility of operation in cold and inclement weather conditions. Thus, for example, the preferred embodiment of the invention finds the canopy enclosing a volume of about 39 cubic feet, whereas the transparent area of the plastic constituting the sheeting and covering of the framework will have an area of about 57 square feet. Generally, it will be preferred that the canopy encloses a volume in cubic feet which has a transparent area in square feet which is about twice of the volume in cubic feet. This will enable a greenhouse effect to be achieved with the temperature within the canopy being raised by at least an amount of approximately 15 to 30 degrees Fahrenheit. It has been found specifically that the cabin within the canopy remains comfortably warm with a natural heat input of approximately 300 BTU's per hour, and this degree of heat input is readily achieved in accordance with the particular fabrication of the canopy in accordance with the invention.

As has been mentioned above and as is more readily seen with reference to FIG. 4, the sides of the vehicle are tapered inwardly by an angle generally indicated at E and varying according to construction from approximately four to ten degrees. This degree of deformation of the sides enables the sides to be placed under tension thereby holding taut the plastic sheeting covering the framework in the manner which has been described hereinabove. According to what has been stated above, the frame forming the canopy of the invention includes first and second connected planar sections, the first section being rearwardly inclined at an angle substantially greater than that of the second section which extends rearwardly above the aforesaid source of power and the center of gravity generally controlled thereby. This provides the generation of a vertical air resistance vector generally in the vicinity of the source of power and passing through or adjacent the center of gravities mentioned hereinabove. As may be noted from the aforegoing description, the second section is resiliently hinged to the first section, with the first section having an area of approximately 1,500 square inches ±10%, the second section having an area of about 850 square inches ±10%. The first section is the section X, whereas the second section is the section Y, all as mentioned in the aforegoing. The frame means moreover has a rear portion including third and fourth connected planar sections extending in sequence downwardly from the rearmost part of the second section, the fourth section being of a more vertical attitude than the third section. The area of the third section is preferably in the order of about 900 square inches ±10%, and the area of the fourth section is about 630 inches ±10%. It will be understood that according to the description given hereinabove, the sections form a jaw whereto are added the tusk-like members discussed previously in relation to FIG. 13 (see members 164,166 and 160,162). The jaws are such as to resiliently resist outward deflection but permit such deflection as will enable the tusk-like members to be entered into tubes accommodating and holding the same. Thus, for purposes of assembly, the jaws are forced slightly open, and the tusk-like members are inserted into the accommodating tubes. Thereafter, the jaws are permitted to close under their own resilient forces, thereby locking the canopy detachably to the vehicle in a manner permitting ready removal. Such operation can be readily undertaken by persons without mechanical ability or without engineering know-how inasmuch as the canopy is itself relatively light in weight. Thus, for example, for the preferred design, wherein the vehicle has a weight of about 300 pounds and the source of power weighs about one-third of the weight of the vehicle, the canopy will weigh in the order of approximately 26 pounds, thereby permitting the easy handling thereof and the assemblage of the same with the balance of the vehicle.

The canopy, with its relatively light weight, requires that it be formed of a relatively thin plastic. Such plastic may, as has been mentioned herein, be in the order of about 0.006–0.010 inches and will be fabricated, for example, of polyvinyl chloride or the like. The canopy includes detachable doors, which, along with the removability of the canopy or parts thereof, provide a fun-to-use vehicle, the doors of which are removable and the construction of which provides for great personal convenience. Aside from the great personal convenience and sporting aspects of the construction, there is also afforded relatively easy means of ventilation. The door sheeting, as mentioned hereinabove, can be folded downwardly over the struts 18 or removed in entirety. In the preferred case, it will be realized that provision is made for the opening of windows. The part 134 is readily removable, thereby providing for additional ventilation. There is thus provided a community with the outdoors and the sporting use of the vehicle of the invention is greatly enhanced by the wind resistance and the sensing of the whipping of the wind around the vehicle under the slow speeds which are employed deliberately according to further features of the invention.

It has been found that the wind resistance of the vehicle, aside from the utility mentioned hereinabove, is not a harmful factor at the speeds selected for the operation of the vehicle, notably, about 15–25 miles per hour. This speed is deliberately selected in this range so that the utilization of the vehicle in upwind and downwind directions is not significantly altered. This speed range avoids wind problems, and, to this end, a relatively low horsepower motor is employed, namely, within the range of from one-half to one horsepower, thereby deliberately achieving, in view of the weight and other dimensions of the vehicle construction, the desired speeds. If the vehicle were made heavier, it would be further confined as to speed and range and would not achieve the notable human engineering aspects of the design whereby a sporting and economic use are simultaneously obtained.

In a preferred construction, the wheel base of the vehicle preferably runs about 53 inches with an overall length of about 73 inches, whereas the tread width of the vehicle of the invention is approximately 31 inches with an overall width of about 36 inches. The length and width of the vehicle and their wind resistance characteristics creates stability with an efficient drive due to the angles of the windshield and other canopy sections, and, to the ends of achieving an effectively economical drive, the front wheel is selected and positioned to diverge the windstream about the battery pack, thereby to achieve an especially efficient utilization.

The seating for the passengers is arranged above the rear wheels and center of gravity, thereby adding to the vertical vector noted hereinabove with respect to wind resistance. The batteries are located preferably under the feet of the passengers and immediately forward of the axes of rotation of the rear wheels.

FIGS. 20–23 illustrate some further modifications of the invention wherein appears a battery pack 370 of the aforenoted type in a vehicle corresponding to that illustrated in FIGS. 1–6 with the exception that rear wheels 372 and 374 are respectively driven by a motor 376 coupled to and supplied with power by battery pack 370 and by pedals indicated at 378. The motor 376 is coupled via chain 380 to a sprocket driving shaft 382 whereas pedals 378 are connected via chain 384 to a sprocket driving shaft 386. Thus, since shafts 382 and 386 are not connected and operate independently of one another, the motor 376 can drive the vehicle independently of the pedals and vice versa.

Figure 22:
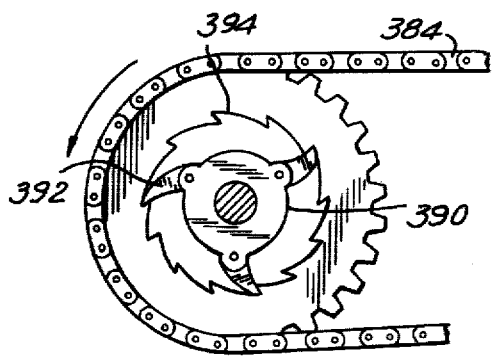
FIG. 22 is an enlarged view of a detail of the modifications of FIGS. 20 and 21.

FIG. 22 shows a one-way clutch indicated at 390 whereof pawls 392 engage in notches 394 when appropriately extended to provide for a connection or not of the chain drive 384 as a consequence of which, the motor 376 can be driven without necessitating a rotation of the pedals 378, thereby avoiding injury to the driver.

Figure 23:
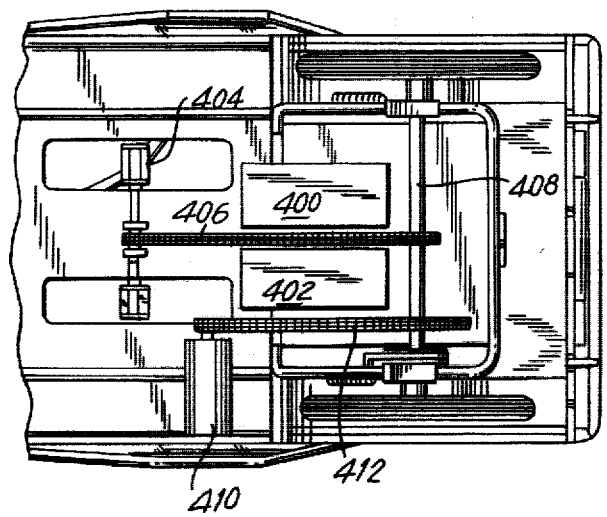
FIG. 23 illustrates a further modification of FIG. 20.

In the embodiment of the invention illustrated in FIG. 23, the battery pack is shown in two halves 400 and 402, each of which includes a 12-volt battery operating in a manner indicated hereinabove. Pedals 404 are employed to drive a chain 406 driving a shaft 408 which chain is arranged so as to pass between the pack halves 400 and 402. The motor 410 drives chain 412 which similarly drives shaft 408. Provision is made for a clutch connection of the pedals to the shaft 408 via chain 406 to avoid the necessity that the motor 410 drives the pedals 404, thereby preventing possible danger to the driver.

Figure 20:
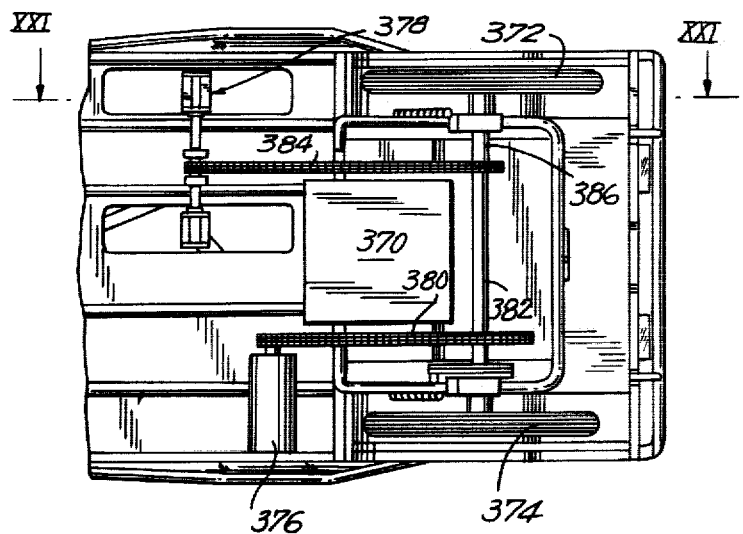
FIG. 20 is a bottom fragmentary view of a further modification of the invention.
Figure 21:
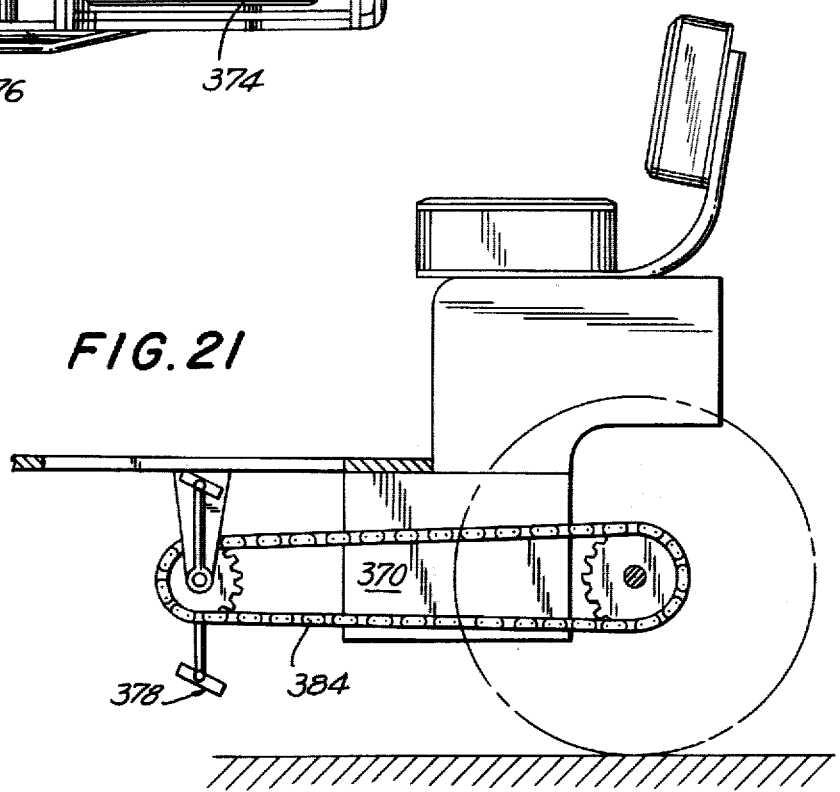
FIG. 21 is a side view of the modification of FIG. 20.
Figure 24:
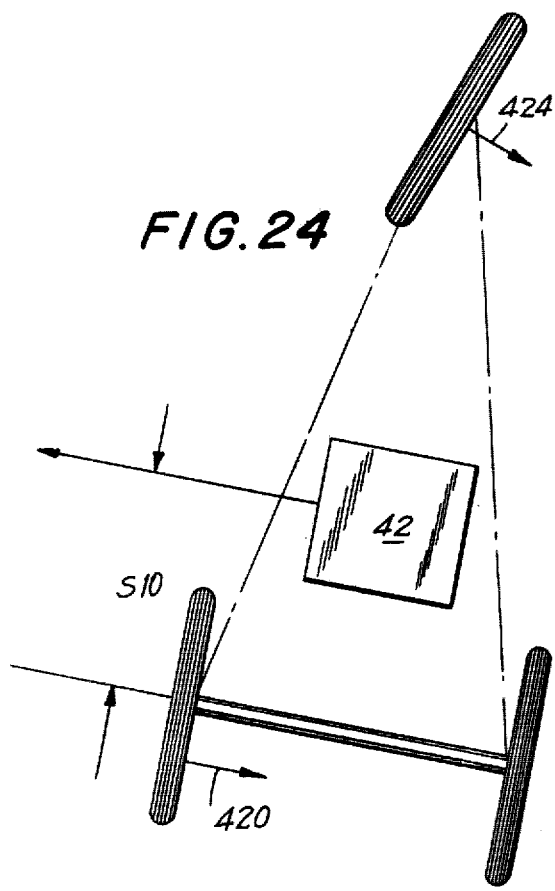
FIGS. 24 and 25 illustrate dynamic characteristics of the structures of FIGS. 20-23.
Figure 25:
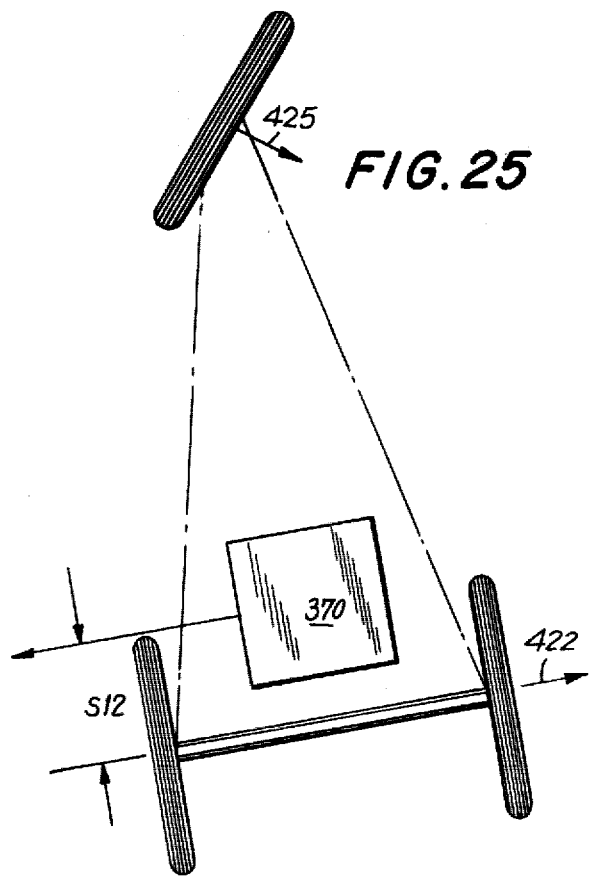

FIGS. 24 and 25 show the dynamic conditions of driving relative to the forward and rear positions of the battery packs such as, for example, the forward battery pack 42 of FIGS. 1–6 and the rearwardly positioned battery pack 370 of FIG. 20. Therein it will be observed that the distance between the battery pack and the related axle in FIG. 24 is distance S 10 which is much greater than the corresponding distance S 12 in FIG. 25. As a consequence thereof, the direction of force of the rearmost wheels is indicated by arrow 420 in FIG. 24, whereas the same force is indicated by arrow 422 in FIG. 25. This, under the circumstances of an example right turn indicated by arrows 424 and 425 in FIGS. 24 and 25, provides for the generation of a scrubbing or erosion force on the front wheel under the circumstances illustrated. The force in the arrangement in FIG. 24, while being acceptable, is greater than the force indicated in FIG. 25 which indicates that the further to the rear that the battery pack is positioned, the more satisfactory are the results which are achieved in accordance with the invention.

In addition to the features mentioned hereinabove, attention is directed to the fact that the doors detachably affixed to the canopy and hingeably accommodated thereon are provided with belts 202 and 204 as mentioned hereinabove relative to FIG. 13. These belts are of sufficient length that the doors are permitted to flap open to a slight degree of three to five inches or to a greater degree if desirable. The belts 202 and 204 may be connected together by Velcro or may be knotted together at the free extremities thereof. The extremities attached to the door frame may be held on by Velcro or the like. The purpose of this arrangement is to minimize the effect of air resistance and wind on the operation of the device and to accommodate a movement of air within the cabin of the vehicle to an extent essential to promote the stability thereof. Accordingly, the belts 202 and 204 constitute an important feature of the invention.

The fact that the doors are permitted to open to a slight degree when the vehicle is in operation does not appear to hamper the self-heating feature of the invention whereby the heat of the body, which is supplied by the rate of 300 BTU's per hour, is capable of elevating the temperature within the cabin. This has been discussed above, but requires some additional comment in that the volume of the cabin is purposely made small so that in the conjunction with the relatively low speed of the vehicle and the shapes of the various canopy sections thereof as well as the areas of the same, in further conjunction with the verticality of the back and front, all operate to reduce any heat loss so that the canopy operates as a greenhouse to admit the influx of radiation while minimizing heat loss. The vehicle of the invention thereby compares favorably with streamline vehicles operating at a higher rate of speed wherein, without the supply of an external source of heat, the streamline type of vehicle becomes very uncomfortable during operation at relatively low temperatures.

It is further pointed out that the vehicle of the invention conveniently utilizes two speeds and voltages in an unusual manner to provide for all degrees of mobility and maneuverability suitable for making the vehicle of the invention eminently suitable for sports use as well as utility operation. The concept of utilizing a hand control on a steering apparatus to afford the selection of two grades of speeds and voltages to provide for the spectrum of usages which the vehicle of the invention affords is a novel concept with the invention and operates in conjunction with and supplemental to the various features noted above to permit the achieving of the same.

There will now be obvious to those skilled in the art many modifications and variations of the structures and circuits set forth hereinabove. These modifications and variations will not depart from the scope of the invention if defined by the following.

What is claimed is:

1. A vehicle comprising frame means adapted to support at least one passenger, a source of power, three wheels on and supporting said frame means for ground traversing movement, an electric motor coupled to and driving at least one of said wheels and being coupled to and driven by said source of power, said source of power being located relatively low in said vehicle and constituting a substantial portion of the weight of the vehicle whereby to define for said vehicle a relatively low center of gravity, said wheels defining respective axes of rotation and said center of gravity being substantially no higher than said axes, the source of power including a battery pack having a weight of at least about one hundred pounds, braking means for braking said vehicle inclusive of the weight of said battery pack, said braking means including mechanical and electromagnetic brakes cooperatively operable, a braking light, and a braking light circuit coupled to said light to supply electrical current to the light for operating the same when said braking means is operated, said braking means including means at least partly constituting said electromagnetic brakes for electromagnetically braking said vehicle by the use of said current and steering means coupled to one of said wheels and including a yoke with two handles, said braking means including levers on said handles to control said mechanical brakes and rotary members on said handles to selectively actuate said batteries and electro-magnetic brakes.

2. A vehicle as claimed in claim 1 wherein said center of gravity with said vehicle unloaded is no more than about 13 inches above ground.

3. A vehicle as claimed in claim 1 comprising passenger seating means in said frame means for seating passengers at a height of about 26–32 inches above the ground, said center of gravity with said vehicle carrying a passenger load of about 400 pounds being no more than about 28 inches above ground.

4. A vehicle as claimed in claim 2 comprising passenger seating means in said frame means for seating passengers at a height of about 26–32 inches above the ground, said center of gravity with said vehicle carrying a passenger load of about 400 pounds being no more than about 28 inches above ground.

5. A vehicle as claimed in claim 3 wherein said source of power includes at least a battery pack constituting at least about one-third of the weight of the unloaded vehicle.

6. A vehicle as claimed in claim 5 wherein two of said wheels are arranged in parallel with each other and are located to the rear of the third of said wheels, said battery pack being located closer to the parallel wheels than to said third wheel.

7. A vehicle as claimed in claim 6 wherein the battery pack is located at least partly between the parallel wheels.

8. A vehicle as claimed in claim 6, wherein said vehicle has a longitudinal axis, comprising a steering column connected to said third wheel and located generally on said longitudinal axis, and steering means coupled to said steering column and centered about an axis spaced laterally from said longitudinal axis.

9. A vehicle as claimed in claim 6 wherein said frame means includes a lightweight canopy including a framework of hollow tubing and plastic sheeting on said framework to provide an enclosure for passengers.

10. A vehicle as claimed in claim 1 wherein said electric motor is a D.C. motor and said battery pack includes two lead-acid storage batteries adapted for being selectively used separately or in series.

11. A vehicle as claimed in claim 1 comprising pedals on said framework and coupled to one of said wheels to supply motive power thereto.

12. A vehicle as claimed in claim 1 wherein said frame means includes a canopy including first and second connected planar sections, the first section being rearwardly inclined at an angle substantially greater than that of the second section which extends rearwardly above said source of power whereby to generate a vertical air resistance vector generally in the vicinity of the source of power.

13. A vehicle as claimed in claim 12 wherein the angle of the first section is about 64°±10% and the angle of the second section is about 8°±10%.

14. A vehicle as claimed in claim 13 wherein the second section is resiliently hinged to the first section.

15. A vehicle as claimed in claim 14 wherein the first section has an area of about 1500 square inches ±10% and the second section has an area of about 850 square inches ±10%.

16. A vehicle as claimed in claim 12 wherein said frame means includes a rear portion including third and fourth connected planar sections extending in sequence downwardly from said second section, said fourth section being of more vertical attitude than said third section.

17. A vehicle as claimed in claim 16 wherein the angle of the third section is about 54°±10% and the angle of the fourth section is about 94°±10%.

18. A vehicle as claimed in claim 17 wherein the area of the third section is about 900 square inches ±10% and the area of the fourth section is about 630 square inches ±10%.

19. A vehicle as claimed in claim 16 wherein the rear portion is resiliently urged towards said first section.

20. A vehicle as claimed in claim 12 wherein said canopy encloses a volume of about 39 cubic feet and has a transparent area of about 57 square feet whereby to promote a greenhouse effect.

21. A vehicle as claimed in claim 18 wherein said canopy encloses a volume of about 39 cubic feet and has a transparent area of about 57 square feet whereby to promote a greenhouse effect.

22. A vehicle as claimed in claim 12 wherein said canopy encloses a volume in cubic feet and has a transparent area in square feet which is at least about twice the volume in cubic feet.

23. A vehicle as claimed in claim 12 wherein the vehicle has a weight related to said source of power to enable the vehicle to be driven at a speed of 15–25 miles per hour.

24. A vehicle as claimed in claim 23 wherein said motor has a rating of from $\frac{1}{2}$ to 1 horsepower.

25. A vehicle as claimed in claim 23 wherein said source of power weighs about one-third the weight of the vehicle.

26. A vehicle as claimed in claim 25 wherein the vehicle has a weight of about 300 pounds.

27. A vehicle as claimed in claim 12 wherein said canopy is detachable.

28. A vehicle as claimed in claim 27 wherein said canopy is detachable.

29. A vehicle as claimed in claim 12 wherein said canopy includes detachable doors and is substantially entirely covered with transparent plastic of about 0.006–0.010" thickness.

30. A vehicle as claimed in claim 17 wherein said canopy includes detachable doors and is substantially entirely covered with transparent plastic of about 0.006–0.010" thickness.

31. A vehicle as claimed in claim 29 comprising elastic belt means holding said doors together and permitting limited outward displacement of the same.

* * * * *